United States Patent
Ishii et al.

(10) Patent No.: US 7,990,859 B2
(45) Date of Patent: Aug. 2, 2011

(54) PACKET TRANSMISSION CONTROL DEVICE AND PACKET TRANSMISSION CONTROL METHOD

(75) Inventors: Hiroyuki Ishii, Yokosuka (JP);
Yoshimasa Imamura, Yokohama (JP);
Akihito Hanaki, Yokohama (JP);
Takehiro Nakamura, Yokosuka (JP);
Shinya Tanaka, Yokohama (JP);
Masafumi Usuda, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 886 days.

(21) Appl. No.: 11/579,992

(22) PCT Filed: May 10, 2005

(86) PCT No.: PCT/JP2005/008538
§ 371 (c)(1),
(2), (4) Date: Jul. 13, 2007

(87) PCT Pub. No.: WO2005/109787
PCT Pub. Date: Nov. 17, 2005

(65) Prior Publication Data
US 2008/0069046 A1   Mar. 20, 2008

(30) Foreign Application Priority Data
May 10, 2004   (JP) .................... 2004-140176

(51) Int. Cl.
*G01R 31/08* (2006.01)
(52) U.S. Cl. ............. 370/230; 370/330; 455/452.1
(58) Field of Classification Search .......... 370/200–253, 370/272–309, 431–546, 330–339; 709/231; 455/452.1–455
See application file for complete search history.

(56) References Cited

U.S. PATENT DOCUMENTS

| | | | |
|---|---|---|---|
| 7,519,032 B2 * | 4/2009 | Soomro et al. | 370/338 |
| 2002/0183084 A1 * | 12/2002 | Wu et al. | 455/509 |
| 2003/0128658 A1 * | 7/2003 | Walton et al. | 370/208 |
| 2003/0135632 A1 * | 7/2003 | Vrzic et al. | 709/231 |
| 2003/0227926 A1 * | 12/2003 | Ramamurthy et al. | 370/395.42 |
| 2005/0043031 A1 * | 2/2005 | Cho et al. | 455/450 |
| 2005/0141421 A1 | 6/2005 | Ishi et al. | |
| 2005/0163070 A1 * | 7/2005 | Farnham et al. | 370/328 |
| 2005/0163111 A1 * | 7/2005 | Ishii et al. | 370/360 |
| 2005/0259661 A1 | 11/2005 | Ishi et al. | |

FOREIGN PATENT DOCUMENTS

CN   1347253 A   5/2002
(Continued)

OTHER PUBLICATIONS

Ohta, Yoshiaki et al., "Fairness Property and TPC-Level Performance of Unified Scheduling Algorithm in HSDPA Networks", IEICE Technical Report, vol. 103, No. 573, pp. 78-85, 2004.

(Continued)

*Primary Examiner* — Ricky Ngo
*Assistant Examiner* — Iqbal Zaidi
(74) *Attorney, Agent, or Firm* — Oblon, Spivak, McClelland, Maier & Neustadt, L.L.P.

(57) ABSTRACT

The present invention relates to a packet transmission control device which controls transmission of packets to a plurality of mobile stations. A scheduling unit of the packet transmission control device according to the present invention is configured to schedule the packets to each of the plurality of mobile stations, based on an average transmission rate, a minimum guaranteed transmission rate, a scheduling frequency and capability information.

13 Claims, 9 Drawing Sheets

FOREIGN PATENT DOCUMENTS

| | | |
|---|---|---|
| CN | 1400756 A | 3/2003 |
| JP | 2004 312190 | 11/2004 |
| JP | 2005 191745 | 7/2005 |

OTHER PUBLICATIONS

Tanaka, Shinya et al.,"HSDPA Throughput Performances Using an Experimental HSDPA Transmission System", NTT DoCoMo Technical Journal, vol. 12, No. 4, pp. 20-28, 2005. (With English translation).

Tanaka, Shinya et al., "HSPDA Throughput Performances Using an Experimental HSDPA Transmission System", NTT DoCoMo Technical Journal, vol. 6, No. 4, pp. 18-28, 2005.

Holtzman, Jack M., "CDMA Forward Link Waterfilling Power Control", IEEE VTC2000 Spring, pp. 1663-1667, 2000.

3GPP2 C. S0024, "Cdma2000 High Rate Packet Data Air Interface Specification", Version 1.0, 2004.

3GPP TR 25. 848 v4.0.0 (Mar. 2001), "3 rd Generation Partnership Project; Technical Specification Group Radio Access Network; Physical Layer Aspects of UTRA High Speed Downlink Packet Access (Release 4)", Technical Report, pp. 1-89, 2001.

* cited by examiner

FIG. 6

| TYPE # | UPDATING OPPORTUNITIES FOR $\bar{R}_n$ | METHOD OF CALCULATING $r_n$ |
|---|---|---|
| 1 | FOR EACH TTI DURING CONNECTION | SIZE OF PACKETS CONFIRMED TO BE TRANSMITTED |
| 2 | FOR EACH TTI DURING CONNECTION | SIZE OF PACKETS HAVING BEEN TRANSMITTED |
| 3 | FOR EACH TTI DURING CONNECTION | SAME AS $R_n$ |
| 4 | FOR EACH TTI DURING WHICH CALCULATION IS PERFORMED FOR SCHEDULING | SIZE OF PACKETS CONFIRMED TO BE TRANSMITTED |
| 5 | FOR EACH TTI DURING WHICH CALCULATION IS PERFORMED FOR SCHEDULING | SIZE OF PACKETS HAVING BEEN TRANSMITTED |

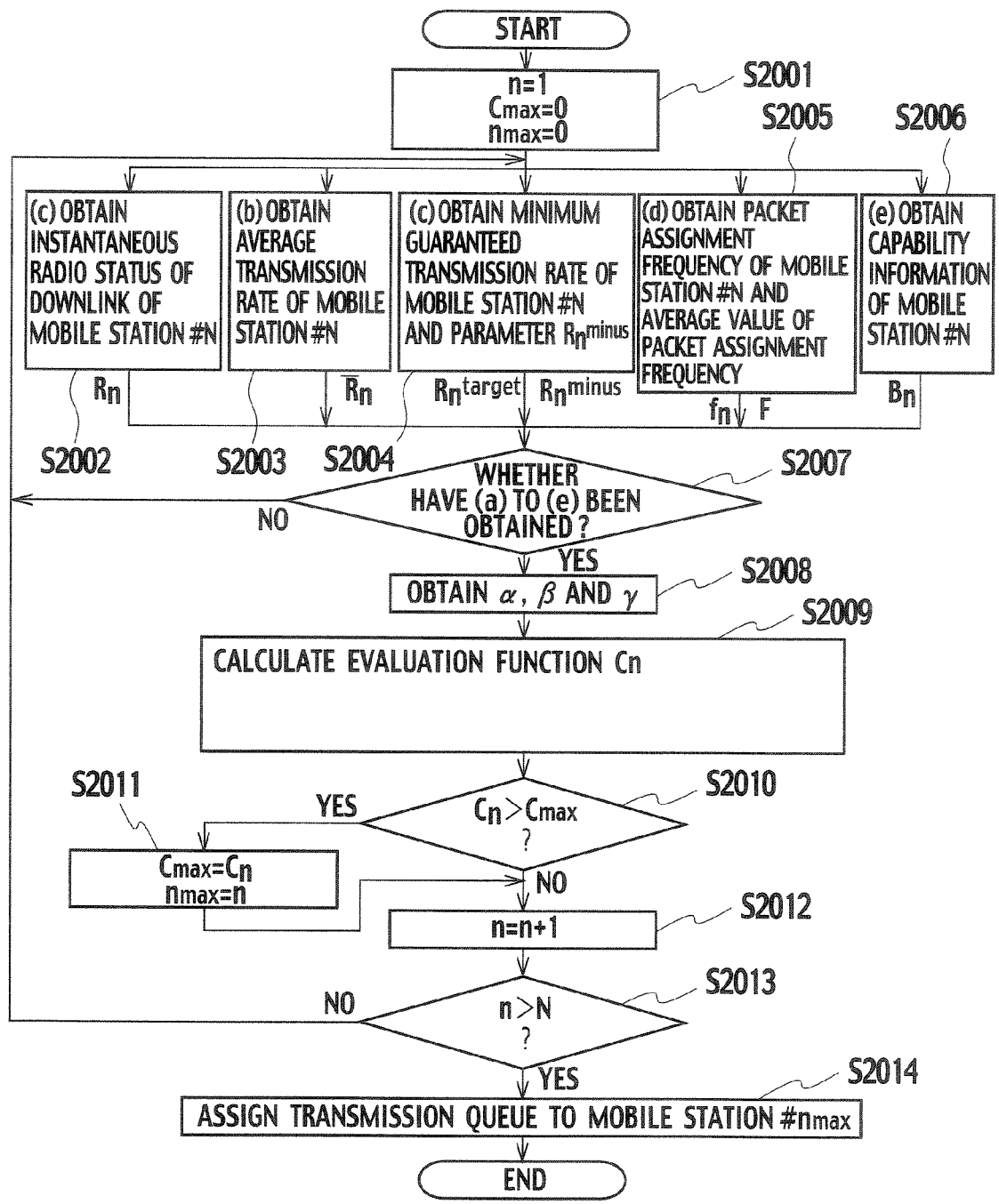

PACKET TRANSMISSION CONTROL DEVICE AND PACKET TRANSMISSION CONTROL METHOD

TECHNICAL FIELD

The present invention relates to a packet transmission control device and a packet transmission control method, which control transmission of packets to a plurality of mobile stations. Specifically, the present invention relates to a packet transmission control device and a packet transmission control method, which control transmission of downlink packets in a mobile communications system.

BACKGROUND ART

In a downlink of a mobile communications system, in some cases, a radio base station has one physical channel shared between the radio base station and mobile stations belonging to the radio base station. Hereinafter, the physical channel used in this case is referred to as "downlink shared channel".

In the downlink shared channel, the radio base station controls the order, in which packets are transmitted to a plurality of mobile stations communicating with the base radio station, based on instantaneous radio quality between the radio base station and each of the mobile stations. This controlling improves a throughput, which the radio mobile station can provide, in other words, so-called system capacity.

Such controlling of the transmission order of packets by a radio base station is called "scheduling". It has been known that, by applying such scheduling to packet transmission, communications capacity is increased, or communications quality is improved (for instance, refer to Non-patent Document 1)

It has been generally considered that requirements for transmission delays are not so strict for target packets in conventional scheduling.

Incidentally, with regard to standardization of the third generation mobile communications system, so-called IMT-2000, there are "3GPP/3GPP2 (Third-Generation Partnership Project/Third-Generation Partnership Project 2)" which have been organized by local standardization organizations and the like. Standardization specifications have been developed as "W-CDMA system" in the 3GPP, and as "cdma2000 system" in the 3GPP2.

In the 3GGP, standardization of "HSDPA (High Speed Downlink Packet Access)", which is a high-speed downlink packet transmission system, has been proceeding. The proceeding is based on an assumption that, with a rapidly-increased use of the Internet in recent years, high-speed and high-capacity traffic would increase due to, for instance, the downloading from databases and Web sites especially in a downlink (for instance, refer to Non-patent Document 2).

From the same viewpoint as above, in the 3GPP2 as well, standardization has been proceeding by means of "1x-EV DO" which is a transmission system dedicated to downlink high-speed data (for instance, refer to Non-patent Document 3) "DO" in the "1x-EV DO" of the cdma 2000 system means "Date Only".

In the HSDPA, for instance, a scheme for controlling a modulation scheme and an encoding rate of radio channels depending on the radio quality between each mobile station and a radio base station (this scheme is referred to as AMCS (Adaptive Modulation and Coding Scheme) in the HSDPA), and the scheduling which is operated in a cycle of a few milliseconds, are used in a combination. This combination makes it possible to improve a throughput of each mobile station, and a throughput of the entire system.

As a scheduling algorism in a radio base station, a "Round Robin Scheduler" is widely known. The Round Robin Scheduler controls the transmission order of packets waiting for transmission, by allocating the downlink shared channel sequentially to mobile stations (for instance, mobile stations #1→#2→#3 . . . ) which belong to the radio base station.

In addition, as scheduling algorisms in radio base stations, a "Proportional Fairness Scheduler" and a "MAX C/I (Maximum C/I) Scheduler" are known as well, in which the transmission order of packets waiting for transmission is controlled, based on an instantaneous transmission rate and an average transmission rate of packets to each mobile station.

The "Proportional Fairness Scheduling" is a scheduling algorism, with which transmission queues are assigned depending on change in instantaneous radio quality in a downlink of each mobile station while fairness among each mobile station is supported.

By referring to FIG. 9, the Proportional Fairness Scheduling will be briefly described below. FIG. 9 is a flow chart showing operations of the Proportional Fairness Scheduler installed in a radio mobile station.

In the Proportional Fairness Scheduling, an evaluation function of each mobile station belonging to the radio base station is calculated based on a measured instantaneous transmission rate of packets to each mobile station (or instantaneous radio quality between the radio base station and each mobile station) and an average transmission rate of packets to each mobile station (or average radio quality between the radio base station and each mobile station). Thereafter, a transmission queue is assigned to a mobile station which maximizes an evaluation function (in other words, packets are scheduled).

As shown in FIG. 9, in step S1001, the radio mobile station sets initial values as follows:
n=1 (n: a subscript of a mobile station)
$C_{max}=0$ ($C_{max}$: a maximum value of an evaluation function)
$n_{max}=0$ ($n_{max}$: a subscript of a mobile station which maximizes an evaluation function).

In step S1002, the radio base station measures elements necessary for calculating the evaluation function. Specifically, the radio base station measures an instantaneous transmission rate $R_n$ of packets to each mobile station #n and an average transmission rate of packets to each mobile station #n:
$\overline{R_n}$.

In step S1003, the radio base station calculates an evaluation function $C_n$ based on the following formula, using the value measured in step S1002.

$$Cn = \frac{Rn}{\overline{Rn}}$$

In step S1004, the radio base station determines whether or not the evaluation function $C_n$ calculated in step S1003 is larger than the maximum value $C_{max}$ of the evaluation function.

Since $C_{max}=0$ in this case, the determination in step S1004 is YES. In step S1005, the radio base station sets the value of $C_n$ calculated in Step S1003 at $C_{max}$, and sets $n_{max}=1$.

Thereafter, in step S1006, the radio base station increments n by +1. In step S1007, the radio base station determines whether or not n is larger than N (the number of mobile stations communicating with the radio base station).

In a case where n is not larger than N, the operation repeats steps S1002 to S1006, and thus N values of the evaluation function $C_n$ are found sequentially.

In step S1008, the radio base station selects a mobile station $\#n_{max}$ maximizing the evaluation function $C_n$, and assigns a transmission queue to the mobile station $\#n_{max}$.

In this case, the numerator of the evaluation function $C_n$ is an instantaneous transmission rate of packets to each mobile station (or instantaneous radio quality between the radio base station and each mobile station), and the denominator is an average transmission rate of packets to each mobile station (or average radio quality between the radio base station and each mobile station). For this reason, in a case where an instantaneous transmission rate is higher than an average transmission rate, there is a higher possibility that a transmission queue is assigned to a mobile station #n.

Accordingly, in the conventional Proportional Fairness Scheduling, a transmission queue is assigned to a mobile station in a case where an instantaneous transmission rate of the mobile station is higher than its average transmission rate, regardless of whether the average transmission rate of the mobile station is higher or lower. This provides improvement in both throughput and fairness, which result from user diversity gain.

[Non-patent Document 1] J. M. Holtzman, IEEE VTC2000 Spring
[Non-patent Document 2] 3GPP TR25. 848 v4. 0. 0
[Non-patent Document 3] 3GGP2 C. S0024 Rev. 1. 0. 0

The conventional Proportional Fairness Scheduling, however, has a problem that packets cannot be scheduled to each mobile station in consideration of QoS (Quality of Service) of various services including streaming services and video phone services, differences in capabilities among mobile stations, equalization of the scheduling opportunities, and the like.

DISCLOSURE OF THE INVENTION

The present invention has been made in view of the above problem. An object of the present invention is to provide a packet transmission control device and a packet transmission control method, which make it possible to realize the scheduling of packets to each mobile station in consideration of QoS of various services, differences in capabilities among mobile stations, equalization of the scheduling opportunities, and the like, while operating the conventional Proportional Fairness Scheduler.

A first aspect of the present invention is summarized as a packet transmission control device which controls transmission of packets to a plurality of mobile stations, the device including: an average transmission rate obtaining unit configured to obtain an average transmission rate of the packets to be transmitted to each of the plurality of mobile stations; a minimum guaranteed transmission rate obtaining unit configured to obtain a minimum guaranteed transmission rate of the packets to be transmitted to each of the plurality of mobile stations; a scheduling frequency obtaining unit configured to obtain a scheduling frequency indicating a frequency in which the packets have been scheduled to each of the plurality of mobile stations; a capability information obtaining unit configured to obtain capability information on each of the plurality of mobile stations; and a scheduling unit configured to schedule the packets to each of the plurality of mobile stations, based on the average transmission rate, the minimum guaranteed transmission rate, the scheduling frequency and the capability information.

According to this invention, the scheduling unit schedules packets to each of the plurality of mobile stations, based on: the average transmission rate of the packets; the minimum guaranteed packet transmission rate of the packets; the scheduling frequency; and the capability information on the mobile stations. Thus, even in a case where the conventional Proportional Fairness Scheduler is operated, QoS of various services, difference in capabilities among the mobile stations, equalization of the scheduling opportunities and the like can be taken into consideration.

A second aspect of the present invention is summarized as a packet transmission control method which controls transmission of packets to a plurality of mobile stations, the method including of the steps: obtaining an average transmission rate of the packets to be transmitted to each of the plurality of mobile stations; obtaining a minimum guaranteed transmission rate of the packets to be transmitted to each of the plurality of mobile stations; obtaining a scheduling frequency indicating a frequency in which the packets have been scheduled to each of the plurality of mobile stations; obtaining capability information on each of the plurality of mobile stations; and scheduling the packets to each of the plurality of mobile stations, based on the average transmission rate, the minimum guaranteed transmission rate, the scheduling frequency and the capability information.

BRIEF DESCRIPTION OF THE DRAWINGS

FIG. 6 is a table for explaining operations of a mobile station transmission rate calculator of the MAC-hs processor in the baseband signal processor of the radio base station of any one of the embodiments of the present invention.

FIG. 7 is a flow chart showing operations of a MAC-hs processor in a baseband signal processor of a radio base station of each of first and second embodiments of the present invention.

BEST MODE FOR CARRYING OUT THE INVENTION

First Embodiment of the Invention (Configuration of Packet Transmission Control Device of First Embodiment of the Present Invention)

Figure 1:
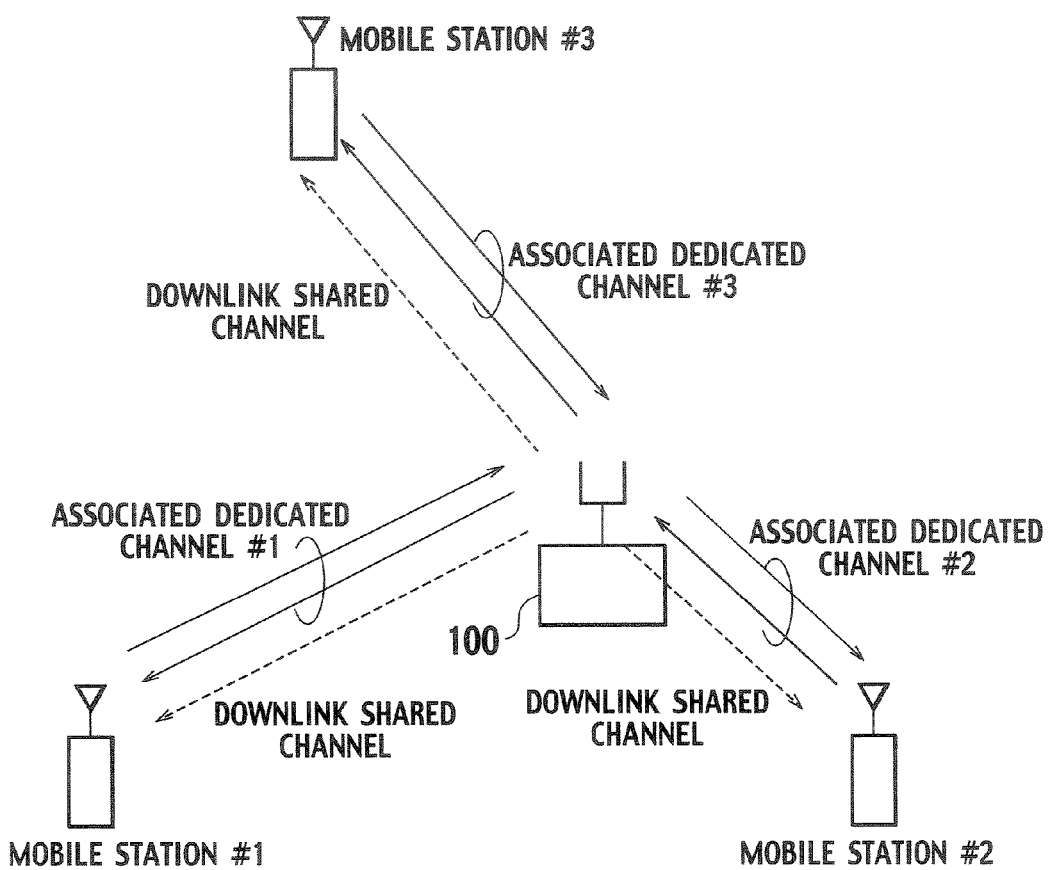
FIG. 1 is an entire configuration diagram of a mobile communications system of any one of embodiments of the present invention.

By referring to the drawings, descriptions will be provided below for a configuration of a packet transmission control device of a first embodiment of the present invention. FIG. 1 is a view showing an example of the configuration of a mobile communications system provided with the packet transmission control device of the first embodiment of the present invention.

In FIG. 1, the mobile communications system is configured of a radio base station 100 and a plurality of mobile stations #1 to #3, and adopts the HSDPA. In this embodiment, descriptions will be provided for an example in which the radio base station 100 is provided with the above-described packet transmission control device.

In downlink packet transmission in the HSDPA, used are a downlink shared channel (HS-SCCH [High Speed Shared Control Channel] or HS-DSCH (High Speed Downlink Shared Channel) shared by mobile stations #1 to #3, and associated dedicated channels #1 to #3 (bidirectional channels in uplink and downlink directions) associated to physical channels individually allocated to the mobile stations #1 to #3.

In the uplink direction of the associated dedicated channels #1 to #3, the following are transmitted in addition to user data: pilot symbols; transmission power control commands (TPC commands) for transmission via the downlink associated dedicated channels; downlink radio quality information used for scheduling of the shared channel and for AMCS (Adaptive Modulation and Coding Scheme); control information for reporting an acknowledgement on the re-transmission control (H-ARQ (Hybrid ARQ)); and the like.

In the downlink direction of the associated dedicated channels #1 to #3, on the other hand, transmitted are transmission power control commands (TPC commands) for transmission via the uplink associated dedicated channels, and the like.

In this embodiment, each of the mobile stations #1 to #3 has the same configuration and the same function, and thus is described as a mobile station #n (n≧1) below unless otherwise noted.

Figure 2:
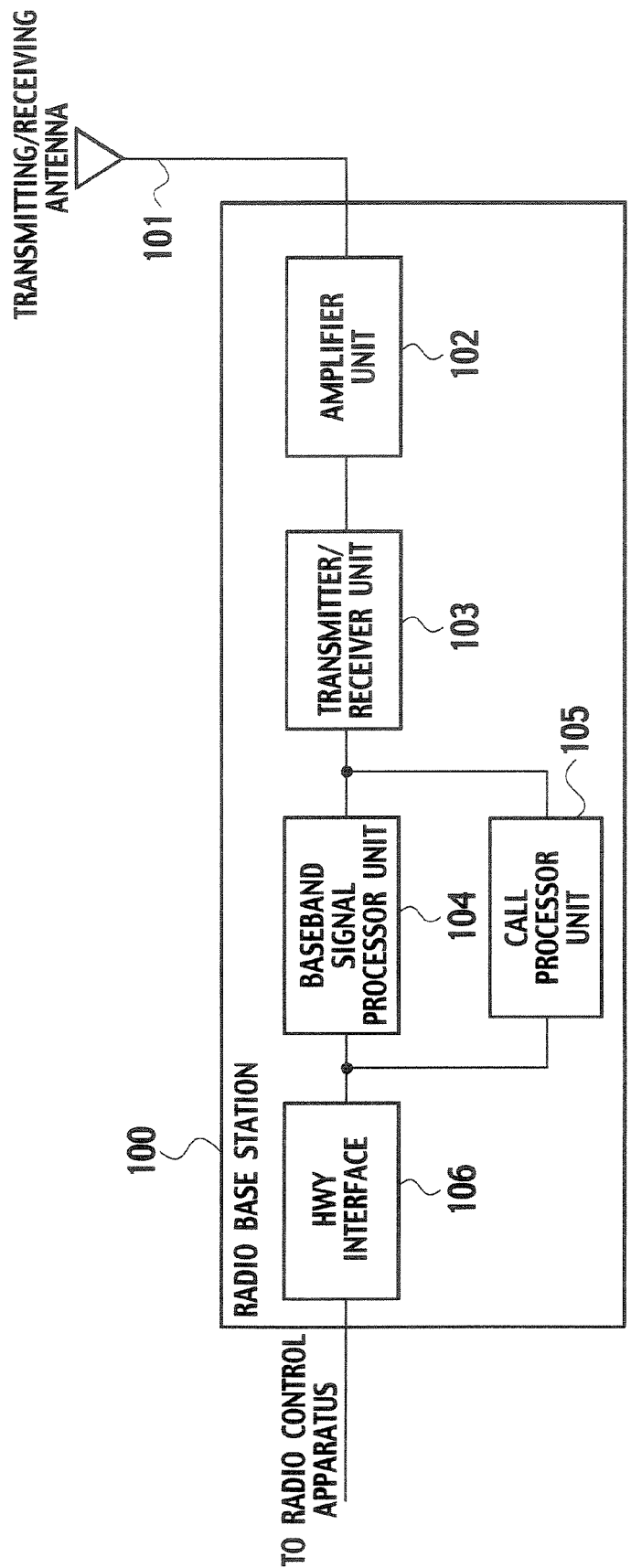
FIG. 2 is a functional block diagram of a radio base station of any one of the embodiments of the present invention.

FIG. 2 is a functional block diagram showing an example of the configuration of the radio base station 100 shown in FIG. 1. In FIG. 2, the radio base station 100 is configured of a transmitting/receiving antenna 101; an amplifier unit 102; a transmitter/receiver unit 103; a baseband signal processor unit 104; call processor unit 105; and an HWY interface 106.

The transmitting/receiving antenna 101 is configured to transmit, to the mobile stations #1 to #3, downlink radio frequency signals including the downlink shared channel and the downlink associated dedicated channels #1 to #3. The transmitting/receiving antenna 101 is configured to receive, from the mobile stations #1 to #3, uplink radio frequency signals including the downlink associated dedicated channels #1 to #3.

The amplifier unit 102 is configured to amplify a downlink radio frequency signal outputted from the baseband signal processor unit 104, and to transmit the amplified downlink radio frequency signal to the transmitting/receiving antenna 101. The amplifier unit 102 is configured to amplify an uplink radio frequency signal from the transmitting/receiving antenna 101, and to transmit the amplified uplink radio frequency signal to the baseband signal processor unit 104.

The transmitter/receiver unit 103 is configured to transmit, to the baseband signal processor unit 104, a baseband signal outputted from the amplifier unit 102, the baseband signal being obtained by performing a frequency conversion process on an uplink radio frequency signal. The transmitter/receiver unit 103 is configured to transmit, to the amplifier unit 102, a downlink radio frequency signal outputted from the baseband signal processor unit 104, the downlink radio frequency signal being obtained by performing a frequency conversion process on a baseband signal to convert the baseband signal into a signal in the radio frequency band.

The baseband signal processor unit 104 is configured to perform processes on downlink packets outputted from the HWY interface, and to transfer the downlink packets to the transmitter/receiver unit 103. The processes include, for instance, a re-transmission control (H-ARQ) process, a scheduling process, a transmission format and resource selection process, a channel encoding process (an error correction encoding process), or a spreading process.

In addition, the baseband signal processor unit 104 is configured to perform processes on a baseband signal outputted from the transmitter/receiver unit 103, and to transfer the signal to the HWY interface 106. The processes include, for instance, a despreading process, a RAKE combining process, or channel decoding process (an error correction decoding process).

Note that the baseband signal includes: quality information on radio status of each of the mobile stations #1 to #3, the quality information being used for a MAC-hs (Medium Access Control-HSDPA) process described below; and acknowledgement information on the re-transmission control (H-ARQ) process. As described below, the decoding process is performed on the information by a layer 1 processor unit 111 in the baseband signal processor unit 104, and the information is then used in a MAC-hs processor unit 112 in the baseband signal processor unit 104.

Figure 3:
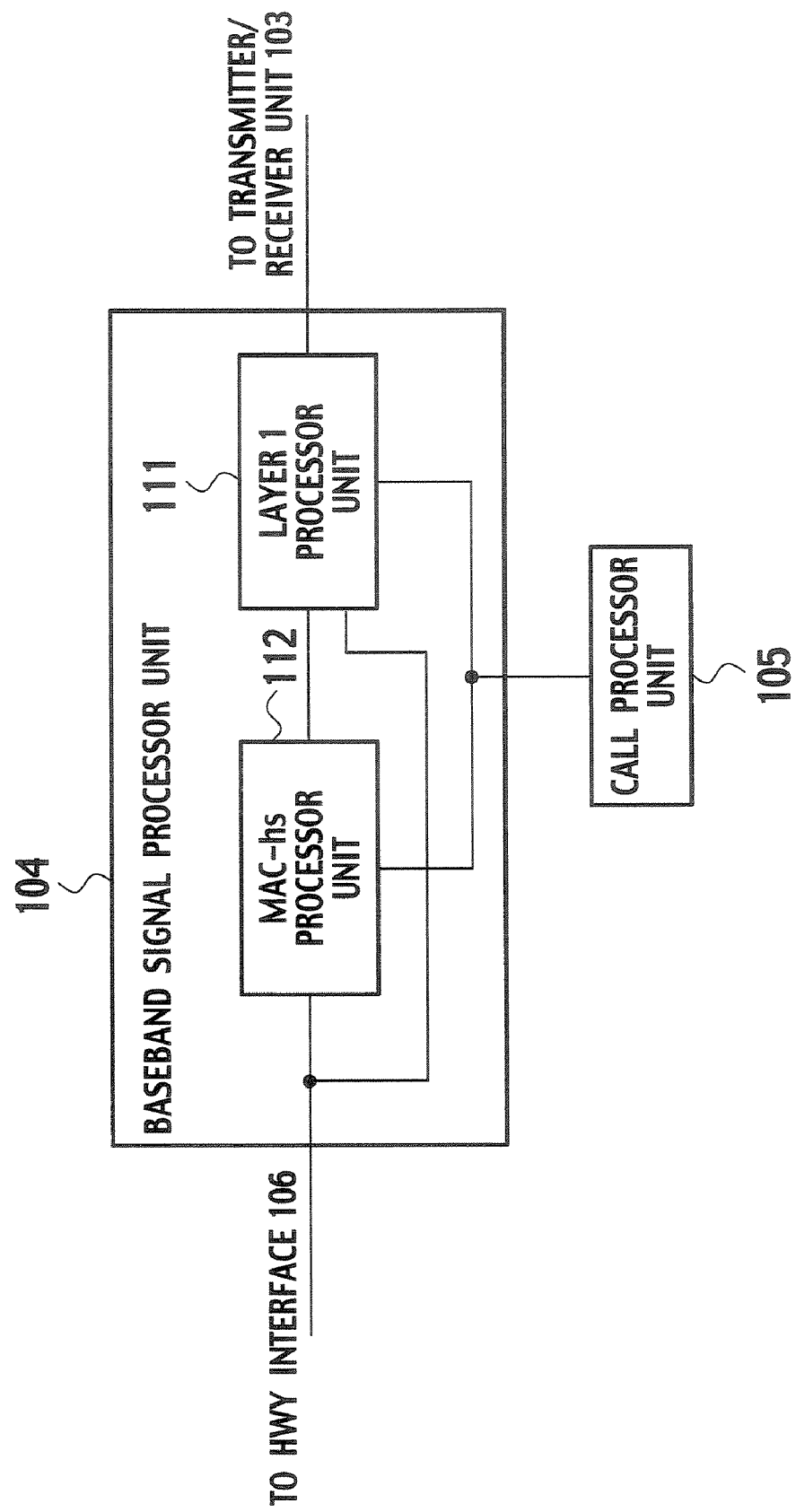
FIG. 3 is a functional block diagram of a baseband signal processor of the radio base station of any one of the embodiments of the present invention.

FIG. 3 shows a functional configuration of the baseband signal processor unit 104. Specifically, as shown in FIG. 3, the baseband signal processor unit 104 is configured of the layer 1 processor unit 111 and the MAC-hs processor unit 112. Note that both the layer 1 processor unit 111 and the MAC-hs processor unit 112 are connected to the call processor unit 105.

The layer 1 processor unit 111 is configured to perform: the error correction encoding process and the spreading process, which are performed on downlink packets; the despreading process, the channel decoding process (the error correction decoding process) and the RAKE combining process, which are performed on uplink packets; and the transmission power control process of bidirectional associated dedicated channels.

The layer 1 processor unit 111 is configured to receive, from each of the mobile stations #1 to #3, the downlink radio quality information (CQI: Channel Quality Indicator) and the acknowledgement information (ACK/NACK/DTX) of H-ARQ, and to then output the information to the MAC-hs processor unit 112. The downlink radio quality information indicates downlink radio quality (radio status), and the downlink radio quality information and the acknowledgement information are reported via a control bit field dedicated to the uplink dedicated physical channels.

Here, the downlink quality information may be, for instance, instantaneous reception SIR (Signal-to-Interference), BLER (Bit Error Rate) and the like.

The MAC-hs processor unit 112 is configured to perform: the re-transmission control (H-ARQ) process of the downlink shared channel in the HSDPA; the scheduling process on packets waiting for transmission; the transmission format and resource selection process; and the like.

Figure 4:
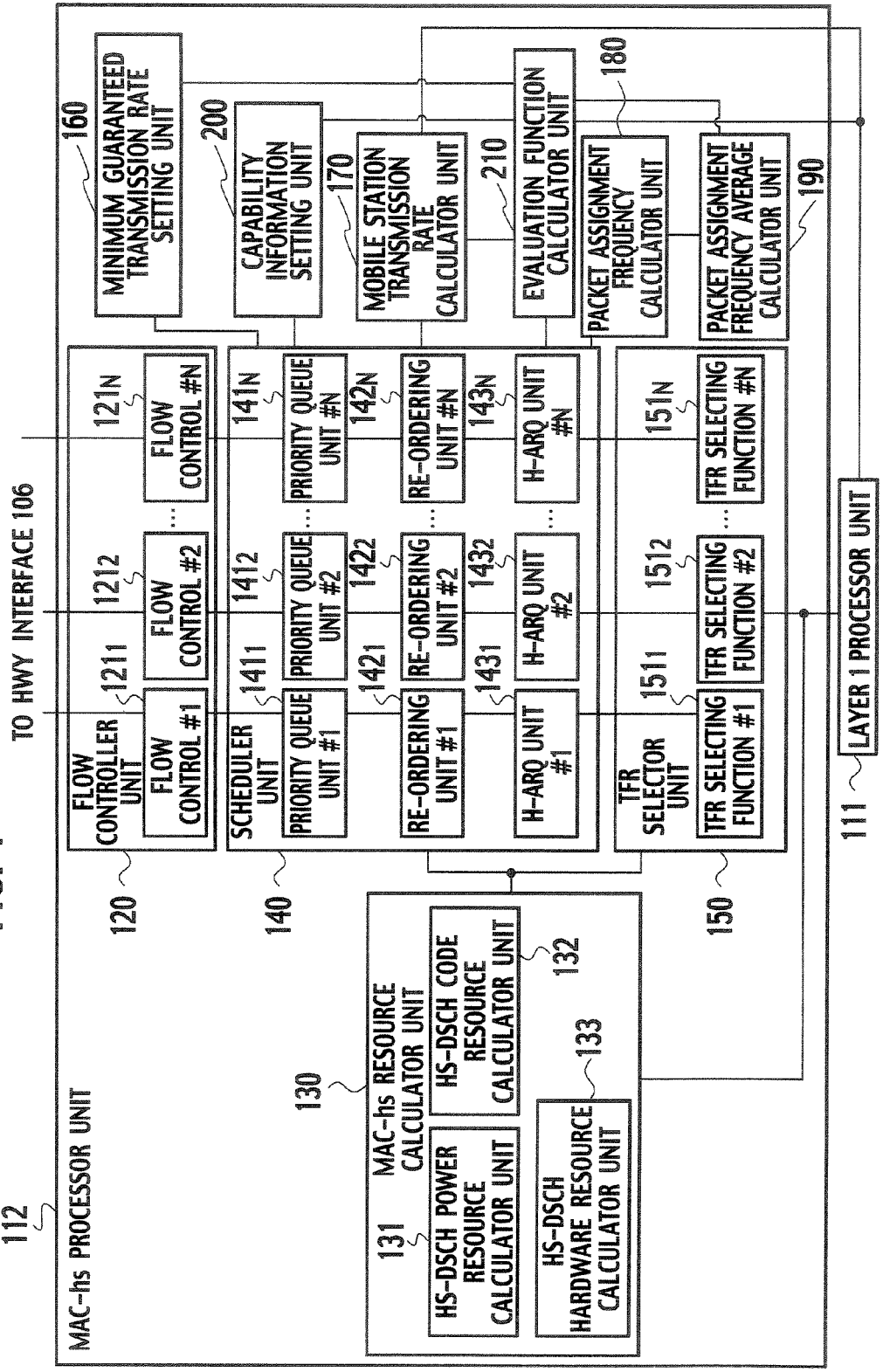
FIG. 4 is a functional block diagram of a MAC-hs processor of the baseband signal processor of the radio base station of any one of the embodiments of the present invention.

FIG. 4 shows a functional configuration of the MAC-hs processor unit 112. As shown in FIG. 4, the MAC-hs processor unit 112 includes: a flow controller unit 120; a MAC-hs resource calculator unit 130; a scheduling unit 140; a TFR (Transport Format and Resource) selector unit 150; a minimum guaranteed transmission rate setting unit 160; a mobile station transmission rate calculator unit 170; a packet assignment frequency calculator unit 180; a packet assignment frequency average calculator unit 190; a capability information setting unit 200; and an evaluation function calculator unit 210.

The flow controller unit 120 is configured of a plurality of flow controls (#1 to #N) 121₁ to 121_N, and includes a function of adjusting transmission rate of downlink packets, which are transmitted from a radio control device via the HWY interface 106, based on the capacity of an installed transmission queue (buffer) and the like.

Each of the flow controls (#1 to #N) 121₁ to 121_N is configured to monitor the traffic amount (flow) of downlink packets, and to perform a process for suppressing an amount of packets to be transmitted, when the flow of downlink packets is increased and thus the capacity of the transmission queue (buffer) is reduced. Note that the flow controls (#1 to #N) 121₁ to 121_N correspond respectively to connections #1 to #N between the radio base station 100 and each of the mobile stations #1 to #N.

The MAC-hs resource calculator unit 130 is configured to calculate radio resources (a power resource, a code resource, a hardware resource and the like) allocated to the HS-DSCH. The MAC-hs resource calculator unit 130 includes: a HS-DSCH power resource calculator unit 131 which calculates the power resource; an HS-DSCH code resource calculator unit 132 which calculates the code resource; and a hardware resource calculator unit 133 which calculates the hardware resource.

The scheduling unit 140 is configured to perform a scheduling process on downlink packets to be transmitted to each mobile station.

In this embodiment, as described below, the scheduling unit 140 is configured to perform scheduling of packets which are to be transmitted to the mobile stations #1 to #n, based on: average transmission rates of the packets to each of the mobile stations #1 to #n $\overline{R}_1$ to $\overline{R}_n$;

minimum guaranteed transmission rates $R_1^{target}$ to $R_n^{target}$ of packets to each of the mobile stations #1 to #n; scheduling frequency $f_1$ to $f_n$ indicating frequency in which packets are scheduled to each of the mobile stations #1 to #n; and capability information $B_1$ to $B_n$ of each of the mobile stations #1 to #n.

Specifically, the scheduling unit 140 is configured to select the mobile station #$n_{max}$ realizing a maximum evaluation function $C_{max}$ among evaluation functions $C_1$ to $C_n$ of the respective mobile stations #1 to #n, the evaluation functions being calculated by the evaluation function calculator unit 210 Thereafter, the scheduling unit 140 is configured to assign a priority queue 141 (that is, the scheduling unit 140 is configured to assign a resource for downlink packet transmission) to the mobile station #$n_{max}$. Note that the evaluation function $C_n$ used in the packet transmission control device of this embodiment will be described later.

The scheduling unit 140 may be configured to preferentially schedule packets whose average transmission rate, as described above, is close to the above-described minimum guaranteed transmission rate.

As shown in FIG. 4, the scheduling unit 140 includes: N priority queues (#1 to #N) 141₁ to 141_N; N re-ordering units (#1 to #N) 142₁ to 142_N; and N H-ARQ units (#1 to #N) 143₁ to 143_N.

Note that the priority queues (#1 to #N) 141₁ to 141_N, the re-ordering units (#1 to #N) 142₁ to 142_N, and the H-ARQ units (#1 to #N) 143₁ to 143_N correspond to the connections #1 to #N between the radio base station 100 and each of the mobile stations #1 to #N respectively.

The priority queues (#1 to #N) 141₁ to 141_N are transmission queues provided respectively to the connections. In other words, each of the priority queues (#1 to #N) 141₁ to 141_N is configured to accumulate downlink packets until being selected in the scheduling process.

Generally, one priority queue is used for one mobile station. However, in a case where a plurality of connections are set in a single mobile station, a plurality of priority queues are used for the single mobile station.

In the re-transmission process using the H-ARQ, each of the re-ordering units (#1 to #N) 142₁ to 142_N is configured to add sequence numbers to downlink packets so that the mobile station #n can perform the reception order control process on the downlink packets, and to perform a window control process in order that the reception buffer of the mobile station #n does not overflow.

Each of the H-ARQ units (#1 to #3) 143₁ to 143_N is configured to perform the re-transmission control process, based on uplink Ack/Nack feedback, by means of the Stop-and-Wait Protocol ARQ of an M process.

Figure 5:
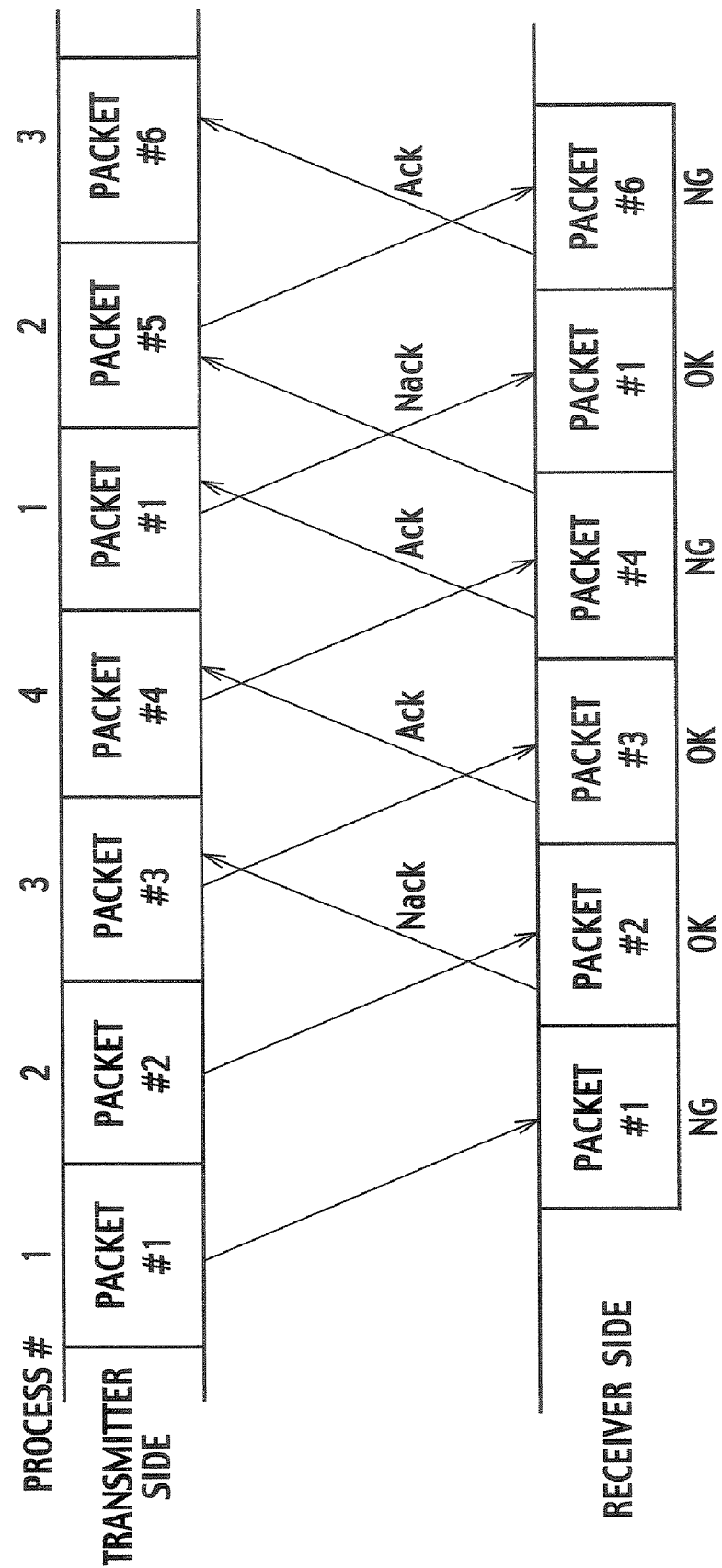
FIG. 5 is a diagram for explaining operations of an H-ARQ unit of the MAC-hs processor in the baseband signal processor of the radio base station of any one of the embodiments of the present invention.

By referring to FIG. 5, descriptions will be provided for an example of operations in the Stop-and-Wait Protocol ARQ, the operations being performed by each of the H-ARQ units (#1 to #3) 143₁ to 143_N.

In the Stop-and-Wait Protocol ARQ, as shown in FIG. 5, once receiving a packet from a transmitter side, a receiver side sends an acknowledgement (Ack/Nack) to the transmitter side. In the example of FIG. 5, since the receiver side failed to receive the packet #1 correctly, the receiver side sends a negative acknowledgement (Nack) to the transmitter side. Meanwhile, since the receiver side successfully receives a packet #2, the receiver side sends a positive acknowledgement (Ack) to the transmitter side. Thereafter, the receiver side repeats the operation for sending an Ack or Nack to the transmitter side in an order of the received packets.

The TFR selector unit 150 is configured of NTFR selection functions (#1 to #3) 151₁ to 151_N. Note that the TFR selection functions (#1 to #3) 151₁ to 151_N correspond respectively to the connections #1 to #N between the radio base station 100 and each of the mobile stations #1 to #N.

Each of the TFR selection functions (#1 to #3) 151₁ to 151_N is configured to determine a downlink transmission format (a code modulation scheme, a modulation multiple value, a coding rate and the like) and a transmission power, which are used in each of the connections #1 to #N. The determination is made based on a CQI, which is a downlink quality indicator received via the uplink channel, and on radio resources (a power resource, a code resource and a hardware resource) calculated by the MAC-hs resource calculator unit 130, in which the radio resources should be allocated to the HS-DSCH, and the like.

Each of the TFR selection functions (#1 to #N) 151₁ to 151_N notifies the layer 1 processor unit 111 of the determined downlink transmission format and transmission power, and the like.

The minimum guaranteed transmission rate setting unit 160 is configured to obtain the minimum guaranteed transmission rates $R_1^{target}$ to $R_n^{target}$ of packets to a mobile station #n.

Specifically, the minimum guaranteed transmission rate setting unit 160 is configured to set a minimum guaranteed transmission rate $R_n^{target}$ which is equivalent to a minimum transmission rate to be guaranteed regarding downlink packets in the priority queues 141₁ to 141_N.

The minimum guaranteed transmission rate setting unit 160 may be configured to set a minimum guaranteed transmission rate $R_n^{target}$ in accordance with a remote instruction via the call processor unit 105.

Alternatively, the minimum guaranteed transmission rate setting unit 160 may be configured to set a minimum guaranteed transmission rate $R_n^{target}$, for each service type, each contract type, each terminal device type, each cell type, or each priority class.

For instance, service types represent types of services for transmitting downlink packets. The services include, for instance, VoIP services, audio services, streaming services, videophone services, FTP services and the like.

Contract types represent types of contracts made by users of mobile stations to which downlink packets are transmitted. The contract types include a Low Class contract and a High Class contract.

Terminal device types are used to classify the mobile stations to which the downlink packets are transmitted. The terminal device types include, for instance, classes based on the identification information on the mobile stations; presence-or-absence or types of a RAKE reception function, an equalizer, reception diversity, an interference canceller and the like; and terminal device capabilities such as a modulation scheme, the number of codes and the number of bits, with all of which data is receivable.

Cell types represent configuration types of cells, in which the mobile stations exist, the downlink packets being transmitted to the mobile stations. For instance, the cell types include: classes based on the identification information on the cells; information on whether the cell is outdoor or indoor; information on whether the cell is in a town or a suburb; and information on whether the cell is in a high traffic area or a low traffic area.

Furthermore, priority classes PC represent priorities in downlink packet transmission. For instance, a downlink packet having a first priority is preferentially transmitted before a downlink packet having the second priority.

In addition, the minimum guaranteed transmission rate setting unit 160 is configured to set a value $R_n^{minus}$, which should be set as the denominator of the evaluation function $C_n$, for each of the priority queues $141_1$ to $141_N$, in a case of $$\overline{R}_n - R_n^{target} \leqq R_n^{minus}.$$

Note that an $R_n^{minus}$ is a second parameter for preventing the above-described average transmission rate from being equal to or smaller than the above-described minimum guaranteed transmission rate.

The minimum guaranteed transmission rate setting unit 160 can set a minimum guaranteed transmission rate $R_n^{target}$ at a value larger than a value which should be actually guaranteed, in order to guarantee the minimum transmission rate more securely.

The minimum guaranteed transmission rate setting unit 160 can set a minimum guaranteed transmission rate $R_n^{target}$ at a value smaller than a value which should be actually guaranteed, in order to guarantee the minimum transmission rate with appropriate fairness.

Alternatively, the minimum guaranteed transmission rate setting unit 160 may be configured to set a minimum guaranteed transmission rate $R_n^{target}$ for each method (to be described below) of calculating an instantaneous transmission rate $r_n$ of packets to each of the mobile stations #n.

The mobile station transmission rate calculator unit 170 is configured to obtain an average transmission rate of packets to each of the mobile stations #1 to #n:

$\overline{R}_1$ to $\overline{R}_n$.

Specifically, the mobile station transmission rate calculator unit 170 calculates an average transmission rate of downlink packets to be transmitted to the mobile station #n at a time point t based on (formula 1) as follows.

$$\overline{R}_n(t) = \delta \cdot \overline{R}_n(t-1) + (1-\delta)^* \gamma n \qquad \text{(formula 1)}$$

In the formula, δ denotes a predetermined parameter for specifying a time period during which the equalizing process is performed, and represents a forgetting factor ($0 \leqq \delta \leqq 0$) for the equalizing process. By controlling δ, it is possible to control the level of fairness of opportunities in terms of time, the opportunities being provided by the scheduler.

For instance, when a value δ is set at "0.9999", the time period for calculating an average transmission rate of packets to each of the mobile stations #1 to #n is longer than the time period in a case where the value δ is set at "0.99". As a result, equalization of the scheduling opportunities for the mobile stations #1 to #n for a longer time period is taken into consideration. Hence, it is made possible to cause a scheduler, which realizes fairness in terms of time at a higher level, to operate.

Conversely, when an average transmission rate of packets to each of the mobile stations #1 to #n is calculated for a shorter time period, in other words, when the value of δ is set smaller, equalization of the scheduling opportunities for the mobile stations #1 to #n for a shorter time period is taken into consideration. Hence, it is made possible to cause a scheduler, which realizes fairness in terms of time at a lower level, to operate.

The parameter δ can be set, in terms of downlink packets to be transmitted to each of the mobile stations #1 to #n, in other words, the downlink packets in each of the priority queues $141_1$ to $141_N$, based on types such as the service types, the contract types, the terminal device types (for instance, types based on the above-described capability information $B_n$), the cell types, and the priority class types.

In addition, in (formula 1), $r_n$ represents an instantaneous transmission rate of packets to the mobile station #n.

An instantaneous transmission rate $r_n$ of packets to the mobile station #n is anyone of: a size of packets (data volume), an acknowledgement of the packets being received from the mobile station #n; a size of packets (data volume) transmitted to the mobile station #n; and a size of packets (data volume) estimated transmittable based on radio quality between the mobile station #n and the radio base station 100, the radio quality being reported by the mobile station #n.

Note that the "size of packets (data volume) estimated transmittable based on the radio status" means a size of packets estimated transmittable at a predetermined error rate, based on: the CQI which denotes downlink quality; an instantaneous SIR of the downlink channel; the instantaneous SIR; the radio resources which are allocated to the HS-DSCH calculated by the MAC-hs resource calculator unit 130; and the like.

The mobile station transmission rate calculator unit 170 is configured to update the average transmission rate of packets for each predetermined TTI (Transmission Time Interval) or for each time interval during which an evaluation function used for packet scheduling is calculated.

For instance, the mobile station transmission rate calculator unit 170 is configured to calculate an average packet transmission rate $r_n$ used to update the average packet transmission rate in accordance with a predetermined calculating method.

Specifically, the mobile station transmission rate calculator unit 170 is configured to update the average packet transmission rate in any one of patterns of types #1 to #5 as shown in FIG. 6.

In a case of the pattern of the type #1, the mobile station transmission rate calculator unit 170 updates the average packet transmission rate, by calculating the size (data volume) of packets whose acknowledgement has been received from the mobile station #1, for each TTI during which the radio base station 100 is connected to a mobile station #1.

In a case of the pattern of the type #2, the mobile station transmission rate calculator unit 170 updates the average packet transmission rate, by calculating the size (data volume) of packets which have been transmitted to the mobile station #n, for each TTI during which the radio base station 100 is connected to the mobile station #n.

In a case of the pattern of the type #3, the mobile station transmission rate calculator unit 170 updates the average packet transmission rate, by calculating the size (data volume) of packets estimated transmittable based on a radio status between the mobile station #n and the radio base station 100, the radio status having been reported by the mobile station #n. The average packet transmission rate is updated for each TTI during which the radio base station 100 is connected to the mobile station #n.

In a case of the pattern of the type #4, the mobile station transmission rate calculator unit 170 updates the average packet transmission rate, by calculating the size (data volume) of packets whose acknowledgement has been received from the mobile station #n. The packet transmission rate is updated for each time interval during which an evaluation function used for packet scheduling is calculated.

In a case of the pattern of the type #5, the mobile station transmission rate calculator unit 170 updates the average packet transmission rate, by calculating the size (data volume) of packets which have been transmitted to the mobile station #n, for each time interval during which an evaluation function used for packet scheduling is calculated.

Note that the mobile station transmission rate calculator unit 170 may be configured, for instance, in the following way in addition to the above-described ways. The mobile station transmission rate calculator unit 170 may be configured to obtain an instantaneous transmission rate $r_n$ of the mobile station #n, by measuring the volume of data in the datalink layer for each predetermined time interval, the data being flown into the MAC-hs processor unit 112, after the mobile station #n enters a communicating state. In this case, the MAC-hs processor unit 112 needs to include a function of measuring a data transmission rate in the datalink layer.

The packet assignment frequency calculator unit 180 is configured to obtain scheduling frequency $f_1$ to $f_n$ respectively indicating frequency in which packets are scheduled to the mobile stations #1 to #n.

Specifically, the packet assignment frequency calculator unit 180 is configured to calculate scheduling frequency (in other words, packet assignment frequency) $f_n$ indicating frequency in which packets are scheduled to the respective mobile stations in the past time period (measurement period). The calculation is made for each mobile station #n, in other words, for each of the priority queues $141_1$ to $141_n$.

For instance, the packet assignment frequency calculator unit 180 calculates scheduling frequency $f_n(t)$ at a time t based on the following formula.

$$f_n(t) = \tau \cdot f_n(t-1) + (1-\tau) \cdot Al_n(t)$$

In the formula, $Al_n(t)$ is information showing whether or not packets are scheduled to the mobile station #n at time t. $Al_n(t)$ is a value which becomes "1" when packets are scheduled to the mobile station #n at time t. $Al_n(t)$ is a value which becomes "0" when packets are scheduled to the mobile station #n at time t.

In addition, τ denotes a forgetting factor given as a parameter. In a case where τ is set at a value close to 1, the above-described time period in which scheduling frequency is measured can be made longer. Hence, it is made possible to enhance fairness in terms of time. Conversely, in a case where τ is set at a smaller value, the above-described time period in which scheduling frequency is measured can be made shorter. Hence, it is made possible to reduce fairness in terms of time.

Alternatively, the packet assignment frequency calculator unit 180 may be configured to calculate the scheduling frequency $f_n(t)$ at time t based on the following formula.

$$fn(t) = \frac{\sum_{\tau=t-T}^{t} Aln(\tau)}{T}$$

In the formula, $Al_n(\tau)$ is information showing whether or not packets are scheduled to the mobile station #n at time τ. $Al_n(\tau)$ is a value which becomes "1" when packets are scheduled to be the mobile station #n at time τ. $Al_n(\tau)$ is a value which becomes "0" when packets are scheduled to the mobile station #n at time τ.

In addition, T is a control parameter for controlling the length of the above-described time period in which the scheduling frequency is measured. In a case where T is set at a larger value, the above-described period in which the scheduling frequency is measured can be made longer. Hence, it is made possible to increase the level of fairness in terms of time. Conversely, in a case where T is set at a smaller value, the above-described period in which the scheduling frequency is measured can be made shorter. Hence, it is made possible to lower the level of fairness in terms of time.

Here, the packet assignment frequency calculator unit 180 may be configured to download the above-described parameters τ and T from an upper node of the radio base station 100. Alternatively, the packet assignment frequency calculator unit 180 may include a terminal device I/F (an external interface function), and may be configured to read the above-described parameters τ and T directly from a terminal device.

The packet assignment frequency average calculator unit 190 is configured to calculate an average value F of scheduling frequencies of the plurality of mobile stations #1 to #n by means of the scheduling frequency $f_1$ to $f_n$ of the respective mobile stations #1 to #n, the scheduling frequency $f_1$ to $f_n$ being calculated by the packet assignment frequency calculator unit 180.

For instance, the packet assignment frequency average calculator unit 190 calculates an average value F of scheduling frequencies of the plurality of mobile stations #n, based on the following formula.

$$F = \frac{\sum_n fn}{n}$$

In addition, it suffices that the packet assignment frequency average calculator unit 190 obtains, as an average value F of scheduling frequencies of the plurality of mobile stations #1 to #n, a statistical center value of scheduling frequency of the plurality of mobile stations. For this reason, the packet assignment frequency average calculator unit 190 may be configured to calculate a center value, a geometric mean, a harmonic mean, and a most frequent value of the scheduling frequency of the plurality of mobile stations.

The capability information setting unit 200 is configured to obtain capability information $B_1$ to $B_n$ of the respective mobile stations #1 to #n. Specifically, the capability information setting unit 200 is configured to set capability information $B_n$ depending on the capabilities of the mobile station #n.

Here, the capability information $B_n$ is set for the mobile station #n, based on: parameters in "UE Capability Category" defined in the 3GPP TS25.306; presence-or-absence of an advanced receiver function (Advanced Receiver); presence-or-absence of a reception diversity function; whether or not transmission diversity can be supported; and the like.

Note that the advanced receiver function denotes an equalizer, an interference canceller, G-RAKE, and the like of a conventional RAKE receiver.

In addition, the parameters in "UE Capability Category" include: a modulation scheme with which data is receivable (for instance, "16QAM and QPSK", "QPSK only", or the like); a maximum number of receivable codes (Maximum number of HS-DSCH codes received); a maximum volume of data which can be received at a time (Maximum number of bits of HS-DSCH transport block received within an HS-DSCH TTI); a memory buffer capacity in a receiver for Turbo decoding (Total number of soft channel bits); minimum value of a time period between a time when the mobile station receives a packet and a time when the mobile station is ready to receive a different packet (Minimum TTI interval); and the like.

The capability information setting unit 200 may be configured to set the above-described capability information Bn corresponding to capabilities of the mobile station #n, in accordance with an instruction from the outside. Specifically, the capability information setting unit 200 may be configured to set the capability information Bn corresponding to the capabilities of the mobile station #n, the capability information setting unit 200 being notified of the capabilities by the signaling by the upper node of the radio base station 100. Alternatively, the capability information setting unit 200 may be configured to set the capability information $B_n$ corresponding to the capabilities of the mobile station #n, the capability information setting unit 200 being notified of the capabilities directly by the mobile station #n. Alternatively, the capability information setting unit 200 may be configured to obtain the capabilities of the mobile station #n from ID or terminal device information on the mobile station #n.

As described below, the evaluation function calculator unit 210 is configured to calculate the evaluation function $C_n$ of each mobile station #n, the evaluation function $C_n$ being used in the scheduling process performed by the scheduling unit 140.

For instance, when calculating the evaluation function $C_n$, the evaluation function calculator unit 210 can use, as "radio status $R_n$", an instantaneous transmission rate $r_n$ at which a packet can be transmitted to a mobile station, and which is estimated based on a value of CQI transmitted from the layer 1 processor unit and the radio resources calculated by the MAC-hs resource calculator unit 130.

In addition, when calculating the evaluation function $C_n$, the evaluation function calculator unit 210 can use, "as radio status $R_n$", a value of CQI transmitted from the layer 1 processor unit.

In addition, when calculating the evaluation function $C_n$, the evaluation function calculator unit 210 can use, "as radio status $R_n$", a value calculated by means of the formula "$R_n = 10^{(CQI/1)}$" with a value of CQI transmitted from the layer 1 processor unit.

The call processor unit 105 is configured to receive or transmit a call processing control signal from or to the radio control device existing in an upper position of the radio base station 100. The call processor unit 105 is also configured to manage the status of the radio base station 100, and to allocate radio resources.

The HWY interface 106 functions as an interface with the radio control device. The HWY interface 106 is configured to transfer downlink packets transmitted from the radio control device to the baseband signal processor unit 104, and to transfer uplink packets transmitted from the base band signal processor unit 104 to the radio control device.

(Operation of Packet Transmission Control Device of the Embodiment)

By referring to FIG. 7, descriptions will be provided for operations of the packet transmission control device of this embodiment. Specifically, descriptions will be provided for operations of the scheduling process for downlink packets, the operation being performed by the MAC-hs processor unit 112.

As shown in FIG. 7, in step S2001, the evaluation function calculator unit 210 performs an initial value setting process for calculating the evaluation function $C_n$ of the mobile station #n. Specifically, the evaluation function calculator unit 210 sets "n=1", "$C_{max}=0$" and "$n_{max}=0$" as initial values. Here, "n" denotes a subscript of the mobile station, "$C_{max}$" denotes a maximum value of the evaluation function $C_n$, and "$n_{max}$" denotes a subscript of a mobile station with which a value of the evaluation function $C_n$ takes on the maximum value.

In step S2002, the evaluation function calculator unit 210 obtains, from the layer 1 processor unit 111, an instantaneous radio status $R_n$ of the downlink between the radio base station 110 and the mobile station #n (or a size (data volume) of packets estimated transmittable based on the instantaneous radio status of the downlink between the radio base station 100 and the mobile station #n).

In step S2003, the evaluation function calculator unit 210 obtains, from the mobile station transmission rate calculator unit 170, an average transmission rate
$\overline{R}_n$
of downlink packets to the mobile station #n.

In step S2004, the evaluation function calculator unit 210 obtains a minimum guaranteed transmission rate $R_n^{target}$ and a parameter $R_n^{minus}$ from the minimum guaranteed transmission rate setting unit 160. The minimum guaranteed transmission rate $R_n^{target}$ should be guaranteed for the packets in a priority queue 141$_n$ assigned to the mobile station #n, and the parameter $R_n^{minus}$ should be set as the denominator of the evaluation function $C_n$.

In step S2005, the evaluation function calculator unit 210 obtains, from the packet assignment frequency calculator unit 180, scheduling frequency $f_n$ indicating frequency in which the packets in the priority queue 141$_n$ have been scheduled in the past, the priority queue 141$_n$ being assigned to the mobile station #n. The evaluation function calculator unit 210 also obtains, from the packet assignment frequency average calculator unit 190, an average value F of scheduling frequencies $f_1$ to $f_n$ respectively of a plurality of mobile stations #1 to #n.

In step S2006, the evaluation function calculator unit 210 obtains capability information $B_n$ of the mobile station #n from the capability information setting unit 200.

In step S2007, the evaluation function calculator unit 210 determines whether or not all types of information in steps S2002 to S2006 have been obtained.

In a case where it is determined that all types of information have been obtained (in a case where the determination is "YES" in step S2007), this operation proceeds to step S2008. Otherwise (in a case where the determination is "NO" in step S2007), the evaluation function calculator unit 210 attempts to obtain information which has not been obtained.

In step S2008, the evaluation function calculator unit 210 receives "parameters α, β and γ", specified remotely via the call processor unit 105, and then, instep S2009, calculates the evaluation function $C_n$ according to the following formula.

$$Cn = Bn \cdot \frac{Rn^\alpha}{(\overline{R}n - Rn^{target})^\beta} \cdot \exp(-\gamma \cdot (fn - F))$$

$$(\text{when } \overline{R}n - Rn^{target} > Rn^{minus}) - \text{(formula 2a)}$$

$$Cn = Bn \cdot \frac{Rn^\alpha}{(Rn^{minus})^\beta} \cdot \exp(-\gamma \cdot (fn - F)) \text{ (when } \overline{R}n - Rn^{target} \leq Rn^{minus}) -$$

(formula 2b)

Once the evaluation function $C_n$ is calculated as described above, the evaluation function calculator unit 210 determines whether or not the calculated evaluation function $C_n$ is the maximum value in step S2010.

Since "$C_{max}=0$ (the initial value)" is set currently, in step S2011, the evaluation function calculator unit 210 sets $C_{max}$ at a value of the evaluation function $C_n$ calculated in step S2009, and sets $n_{max}$ as the subscript "n" of the mobile station #n corresponding to $C_{max}$.

In step S2012, the evaluation function calculator unit 210 increments the value of "n" by "+1" in order to calculate the evaluation function $C_{n+1}$ of the next mobile station #n+1.

In step S2013, the evaluation function calculator unit 210 determines whether or not the value of "n" is larger than the number N of the mobile stations which are communicating with the radio base station 100.

In a case where it is determined, in step S2011, that the value of "n" is not larger than the number "N" of the mobile stations (in a case where the determination is "NO" in step S2011), the loop process of steps S2002 to S2010 is repeatedly performed in this operation until it is determined that the value of "n" is larger than the number "N" of the mobile stations. As a result, the evaluation function calculator unit 210 can calculate evaluation functions $C_n$ of all mobile stations which are communicating with the radio base station 100.

On the other hand, in a case where it is determined, in step S2011, that the value of "n" is larger than the number "N" of the mobile stations (in a case where the determination is "YES" in step S2011), the evaluation function calculator unit 210 instructs the scheduling unit 140 to assign a transmission queue to the mobile station #$n_{max}$ which corresponds to $n_{max}$ set in step S2009.

(Operational Effect of Packet Transmission Control Device of the Embodiment)

In the packet transmission control device of the embodiment, the scheduling unit 140 is configured to schedule packets to each of the plurality of mobile stations, based on: the average transmission rate of the packets; the minimum guaranteed packet transmission rate of the packets; the scheduling frequency; and the capability information on the mobile stations. Thus, even in a case where the conventional Proportional Fairness Scheduler is operated, QoS of various services, difference in capabilities among the mobile stations, equalization of the scheduling opportunities and the like can be taken into consideration.

Specific descriptions will be provided below for operational effects obtained in a case where the evaluation function calculator unit 210 calculates the evaluation function $C_n$ by means of (Formula 2a) and (Formula 2b).

In the (Formula 2a) and (Formula 2b) of this embodiment, the denominator of an evaluation function $$Cn = \frac{Rn^\alpha}{\overline{R}n^\beta}$$

which is used for the general Proportional Fairness Scheduler is replaced with $$(\overline{R}_n - R_n^{target})^\beta \text{ or } (R_n^{minus})^\beta.$$

Hence, in a case where the average transmission rate of packets to the mobile station #n is close to the minimum guaranteed transmission rate, the value of the evaluation function $C_n$ is increased. Thereby, it is made possible to increase the probability that the packets are scheduled to the mobile station #n.

Specifically, in the case of the packet transmission control device of this embodiment, it is possible to add a function of providing a function of guaranteeing the minimum transmission rate to the function of the general Proportional Fairness Scheduler.

Here, a configuration may be adopted in which "$R_n^{target}$" and "$R_n^{minus}$" are specified remotely, for instance, by the upper node (for instance, a radio control device, a server in a core network, or the like). In this case, "$R_n^{target}$" and "$R_n^{minus}$" are included in a call control signal, and the radio base station 100 is notified of "$R_n^{target}$" and "$R_n^{minus}$" by the upper node.

The call processor unit 105 of the radio base station 100 receives "$R_n^{target}$" and "$R_n^{minus}$" included in the above-described call processing control signal, and then transfers "$R_n^{target}$" and "$R_n^{minus}$" to the evaluation function calculator unit 210 of the MAC-hs processor unit 112 in the baseband signal processor unit 104.

The evaluation function calculator unit 210 substitutes transferred "$R_n^{targeted}$" and "$R_n^{minus}$" into the (Formula 2a) or (Formula 2b) to calculate the evaluation function $C_n$.

For instance, in a case where streaming services are provided, the minimum guaranteed transmission rate setting unit 160 sets the minimum guaranteed transmission rate $R_n^{target}$ at "128 (a value equivalent to 64 kbps, and a value which is converted into a transmission block size per TTI)".

Here, it is assumed that radio quality of the mobile station #n, with which an average packet transmission rate is "300", deteriorates due to change in transmission environment, and thus the average transmission rate "300" of packets, which are to be transmitted to the mobile station #n, is gradually decreased.

In this case, the closer to "128" the average transmission rate of packets to the mobile station #n is, the smaller the value of the denominator of the evaluation function $C_n$ is. As a result, the value of the evaluation function $C_n$ is increased. This increases opportunities in which a transmission queue is assigned to the mobile station #n. Accordingly, the average transmission rate of packets to the mobile station #n is increased.

As described, as the average transmission rate of packets to the mobile station #n becomes closer to the minimum guaranteed transmission rate $R_n^{target}$, the level of increasing the evaluation function $C_n$ is higher. This keeps the transmission rate of packets to the mobile station #n higher than the minimum guaranteed transmission rate $R_n^{target}$, and thus the minimum transmission rate of packets to the mobile station #n is guaranteed.

In this embodiment, in a case where the minimum guaranteed transmission rate setting unit 160 sets the minimum guaranteed transmission rate $R_n^{target}$ at a value larger than "128" (for instance, "150") instead of a value "128", even though the desired minimum transmission rate, which should be actually guaranteed, is "64 kbps", the following occurs. The closer to "150" the average transmission rate of packets to the mobile station #n is, the smaller the value of the denominator of the evaluation function $C_n$ is. Accordingly, the value of the evaluation function $C_n$ is increased, and thus opportunities, in which a transmission queue is assigned to the mobile station #n, are increased. As a result, the minimum transmission rate can be guaranteed more securely than the case where the minimum guaranteed transmission rate $R_n^{target}$ is set at "128".

Meanwhile, in this embodiment, in a case where the minimum guaranteed transmission rate setting unit 160 sets the minimum guaranteed transmission rate $R_n^{target}$ at a value smaller than "128" (for instance, "100") instead of a value "128", even though the desired minimum transmission rate, which should be actually guaranteed, is "128", the following occurs. The closer to "100" the average transmission rate of packets to the mobile station #n is, the smaller the value of the denominator of the evaluation function $C_n$ is. Accordingly, the value of the evaluation function $C_n$ is increased, and thus opportunities, in which a transmission queue is assigned to the mobile station #n, are increased.

As a result, the minimum transmission rate is guaranteed at a level lower than that in the case where the minimum guaranteed transmission rate $R_n^{target}$ set at "128". However, it is made possible to guarantee a minimum transmission rate more appropriately than that of the conventional "Proportional Fairness Scheduler (in a case where the minimum guaranteed transmission rate $R_n^{target}$ is set at "0"). In this case, while the minimum transmission rate is not strictly guaranteed, the effects of the conventional "Proportional Fairness Scheduling" are enhanced. Thereby, the throughput of the entire cell is improved.

Specifically, in the case of the packet transmission control device of this embodiment, the minimum guaranteed transmission rate setting unit 160 sets the minimum guaranteed transmission rate $R_n^{target}$ at a value smaller or larger than the minimum guaranteed transmission rate, which should be actually guaranteed. Thereby, it is made possible to control the level at which the minimum transmission rate to be provided is guaranteed.

Note that the minimum guaranteed transmission rate $R_n^{target}$ maybe configured to be set for each priority class, each service type, each terminal device type, each cell type or each contract type.

Meanwhile, in a case where an average transmission rate of packets to the mobile station #n is equal to or smaller than "$R_n^{target}+R_n^{minus}$", the evaluation function $C_n$ is obtained by means of the (Formula 2b).

In the formula, $R_n^{minus}$ is set at an appropriate value. For instance, the $R_n^{minus}$ may be configured to be set for each priority class, service types, each terminal device type, each cell type or each contract type.

For instance, in a case of VoIP services in which a minimum transmission rate needs to be strictly guaranteed, $R_n^{minus}$ is set at "$10^{-10}$" In this case, the value of the evaluation function $C_n$ is significantly larger. The probability that a transmission queue is assigned to the mobile station #n is significantly increased, until the average transmission rate of packets to the mobile station #n becomes larger than "$R_n^{target}+R_n^{target}$". Thereby, it is made possible to strictly guarantee the minimum transmission rate.

For instance, in a case where it is necessary to guarantee a minimum transmission rate, as a contract type, not strictly but at a certain level, $R_n^{minus}$ is set at "1". In this case, since the value of the evaluation function $C_n$ is relatively larger, it is made possible to increase the probability that a transmission queue is assigned to the mobile station #n. In other words, by controlling $R_n^{minus}$, it is possible to control the level at which the minimum transmission rate to be provided is guaranteed.

In addition, it is possible to perform the following control. In a case where the average transmission rate of packets to the mobile station #n is equal to or smaller than "$R_n^{target}+R_n^{minus}$", it is determined that communications, in which a minimum transmission rate is guaranteed, cannot be established between the radio base station 100 and the mobile station #n. Thus, the communications between the radio base station 100 and the mobile station #n are disconnected. In this case, it is not necessary to allocate radio resources to a mobile station with which communication quality is significantly deteriorated, and with which a minimum transmission rate cannot be guaranteed. Hence, the throughput of the entire cell is improved. As a result, the evaluation function calculator unit 210 needs not to use the (Formula 2b) and (Formula 3b) to calculate the evaluation function $C_n$.

Note that, by setting parameters α and β appropriately in this embodiment, it is possible to provide: a "Proportional Fairness Scheduler (α=1, and β=1)" capable of guaranteeing a minimum transmission rate; a "MAX C/I Scheduler (α=1, and β~0 (note that β ≠ 0)" capable of guaranteeing a minimum transmission rate; and a scheduler which has intermediate characteristics between the "Proportional Fairness Scheduler" and the "MAX C/I Scheduler", and which is capable of guaranteeing a minimum transmission rate.

In each of the (Formula 2a) and (Formula 2b) of this embodiment, an evaluation function $$Cn = \frac{Rn^\alpha}{Rn^\beta}$$

which is used in a general Proportional Fairness Scheduler is multiplied by a term $\exp(-\gamma \cdot (f_n-F))$. The term is based on a scheduling frequency (the packet assignment frequency) of a priority queue $141_n$ corresponding to a mobile station #1, and an average value F of the scheduling frequencies (the packet assignment frequencies) $f_1$ to $f_n$ of priority queues $141_1$ to $141_n$ corresponding respectively to a plurality of mobile stations #1 to #n. Hence, it is possible to add a function of equalizing the scheduling opportunities to a function of the general Proportional Scheduler.

For instance, five mobile stations A1, A2, A3, A4 and A5 exist, and scheduling frequencies $f_1$ to $f_5$ in target TTI, in which the scheduling frequency is measured, are respectively "0.1", "0.2", "0.3", "0.4" and "0.5". In this case, in order to realize equalization of the scheduling opportunities, it is necessary to increase the number of assigning opportunities (scheduling opportunities) of the respective mobile stations A1, A2, A3, A4 and A5 in this order, so that a mobile station having smaller scheduling frequency can have a larger number of assigning opportunities.

Here, an average value F of the scheduling frequencies $f_1$ to $f_5$ of the five mobile stations A1 to A5 is "0.3". Accordingly, values of $\exp(-\gamma \cdot (f_n-F))$ corresponding to the mobile stations A1 to A5 are respectively "$\exp(0.2\gamma)$", "$\exp(0.1\gamma)$", "exp "(0.0γ)", "exp(−0.1γ)" and "exp(−0.2γ)". Hence, it is possible to increase the evaluation functions $C_n$ of the mobile stations A1 to A5 in this order.

Furthermore, in the case of the packet transmission control system of the embodiment, it is made possible to control the level of fairness (equalization) of the scheduling opportunities, by controlling a parameter (a forgetting factor) γ.

For instance, in a case where γ is set at a smaller value, differences among values of $\exp(-\gamma \cdot (f_n-F))$, in other words, "exp(0.2γ)", "exp (0.1γ)", "exp(0.0γ)", "exp(−0.1γ)" and "exp(−0.2γ)", are smaller, the values corresponding respectively to the mobile stations A1 to A5. Thereby, it is possible to lower the level of the fairness of the scheduling opportunities.

Meanwhile, in a case where γ is set at a larger value, differences among values of $\exp(-\gamma \cdot (f_n-F))$, in other words, "exp(0.2γ)", "exp(0.1γ)", "exp(0.0γ)", "exp(−0.1γ)" and "exp (−0.2γ)", are larger, the values corresponding respectively to the mobile stations A1 to A5. Thereby, it is possible to increase the level of the fairness of the scheduling opportunities.

Note that the parameter γ for controlling the level of the above-described fairness (equalization) of the scheduling opportunities may be configured to be set for each priority class, each service type, each terminal device type, each cell type, or each contract type.

Alternatively, in the packet transmission control system of this embodiment, the evaluation function calculator unit 210 may be configured to use $$\frac{F - fn}{a} + b,$$

or $-a \cdot x^2 + a \ F_2 + b$, in place of a term $\exp(-\gamma \cdot (f_n-F))$ for realizing equalization of the scheduling opportunities in the evaluation function $C_n$. Here, a and b are arbitrary constant values.

In each of the (Formula 2a) and (Formula 2b) of the packet transmission control device of this embodiment, an evaluation function $$Cn = \frac{Rn^\alpha}{Rn^\beta}$$

is multiplied by capability information $B_n$ corresponding to the capabilities which the mobile station #n has, the evaluation function being used in the general Proportional Fairness Scheduler. Hence, it is possible to realize a function of scheduling depending on capabilities of each mobile station, in addition to the function of the Proportional Fairness Scheduler.

For instance, it is assumed that two mobile stations A1 and A2 exist, the capability of the mobile station A1 is indicated as "presence of the reception diversity function", and the capability of the mobile station A2 is indicated as "absence of the reception diversity function." In the packet transmission control device of the embodiment in this case, a value of capability information $B_{A1}$ of the mobile station A1 is set at "2.0", and a value of capability information $B_{A2}$ of the mobile station A2 is set at "1.0". Hence, it is possible to perform control so that an evaluation function $C_{A1}$ of the mobile station A1 can be larger than an evaluation function $C_{A2}$ of the mobile station A2.

For instance, it is assumed that two mobile stations A1 and A2 exist, the capability of the mobile station A1 is indicated as "the number of receivable codes: 10", and the capability of the mobile station A2 is indicated as "the number of receivable codes: 5". In this case, in the packet transmission control device of this embodiment, a value of the capability information $B_{A1}$ of the mobile station A1 is set at "3.0", and a value of the capability information $B_{A2}$ of the mobile station A2 is set at "1.0". Hence, it is possible to perform control so that an evaluation function $C_{A1}$ of the mobile station A1 can be larger than an evaluation function $C_{A2}$ of the mobile station A2.

In addition, for instance, it is assumed that two mobile stations A1 and A2 exist, the capability of the mobile station A1 is indicated as "presence of reception diversity function", and the capability of the mobile station A2 is indicated as "presence of an equalizer". In this case, in the packet transmission control device of this embodiment, a value of the capability information $B_{A1}$ of the mobile station A1 is set at "2.0", and a value of the capability information $B_{A2}$ of the mobile station A2 is set at "1.5". Hence, it is possible to use evaluation functions, to which priorities are added depending on the capabilities of the mobile stations, in the scheduling process.

Modified Example 1

The packet transmission control device of this embodiment can provide a scheduler which can provide equalization of the scheduling opportunities including, for instance, a "Proportional Fairness Scheduler (α=1, ▫=1)", a "MAX C/I Scheduler (α=1, and ▫~1 (note that ▫▫ 0))", or a scheduler which has intermediate characteristics of the above-described schedulers, by setting predetermined parameters α and ▫ appropriately.

The packet transmission control device of this embodiment may be configured to use a scheduler other than the above-described schedulers. For instance, in a case of using a scheduler whose evaluation function $C_n$ is $$Cn = \frac{Rn^\beta}{Rn^\alpha} \cdot Wn^\gamma,$$

the packet transmission control device of this embodiment changes the evaluation function $C_n$ as follows.

$$Cn = Bn \cdot \frac{Rn^\beta}{(Rn - Rn^{target})^\alpha} \cdot Wn^\gamma \cdot \exp(-\gamma \cdot (fn - F))$$

Thereby, it is made possible to provide, in addition to the functions of the conventional scheduler, a function of guaranteeing a minimum guaranteed transmission rate, a function of equalizing scheduling opportunities, and scheduling depending on capabilities (performances) of the mobile stations.

In the formula, "α, β and γ" are parameters each of which is a value between 0 and 1 inclusive, and $W_n$ denotes a time period during which packets remain in the radio base station 100.

In this embodiment, one mobile station uses one priority queue. However, note that one mobile station can use a plurality of priority queues (for example, K pieces of priority queues) In this case, the packet transmission control device of this embodiment performs scheduling for N×K pieces of priority queues, not for N pieces of priority queues.

The evaluation function calculator unit 210 of the MAC-hs processor unit 112 may be configured of, for instance, a programmable device such as a CPU, a digital signal processor (DSP) or FPGA, which can rewrite programs. The evaluation function calculator unit 210 maybe configured to store a program which is used for calculating an evaluation function $C_n$, in a predetermined memory region, and to download predetermined parameters ($\alpha$, $\beta$, $\delta$ and $\gamma$) to rewrite the program.

In this case, the evaluation function calculator unit 210 may download the predetermined parameters ($\alpha$, $\beta$, $\delta$ and $\gamma$) from the upper node of the radio base station 100. Alternatively, the evaluation function calculator unit 210 may include a terminal I/F (external interface function), and may be configured to read the predetermined parameters ($\alpha$, $\beta$, $\delta$ and $\gamma$) directly from a terminal device.

Furthermore, functional blocks of the MAC-hs processor unit 112 as described above may be divided as hardware, or may be divided as software of programs in a processor.

Second Embodiment of the Present Invention (Packet Transmission Control Device of Second Embodiment of the Present Invention)

Descriptions will be provided for a packet transmission control device of a second embodiment of the present invention, focusing on points different from the transmission control device of the above-described first embodiment.

The packet transmission control device of this embodiment is configured to use an evaluation function $C_n$ in consideration of a minimum value of a time period ($TTI_{min,n}$: Minimum TTI interval) in which a mobile station #n can receive packets.

Specifically, an evaluation function calculator unit 210 of the packet transmission control device is configured to calculate the evaluation function $C_n$ according to the following formula.

$$\begin{cases} Cn = Bn \cdot \dfrac{Rn^\alpha}{(TTI_{min,n} \cdot (\overline{Rn} - Rn^{target}))^\beta} \cdot \exp(-\gamma \cdot (fn - F)) & \text{(formula 2a-1)} \\ \left(\text{when } \overline{Rn} - Rn^{target} > \dfrac{Rn^{minus}}{TTI_{min,n}}\right) \\ Cn = Bn \cdot \dfrac{Rn^\alpha}{(Rn^{minus})^\beta} \cdot \exp(-\gamma \cdot (fn - F)) & \text{(formula 2b-1)} \\ \left(\text{when } \overline{Rn} - Rn^{target} > \dfrac{Rn^{minus}}{TTI_{min,n}}\right) \end{cases}$$

or $$\begin{cases} Cn = Bn \cdot \dfrac{Rn^\alpha}{(\overline{Rn} - TTI_{min,n} \cdot Rn^{target})^\beta} \cdot \exp(-\gamma \cdot (fn - F)) & \text{(formula 2a-2)} \\ (\text{when } \overline{Rn} - TTI_{min,n} \cdot Rn^{target} > Rn^{minus}) \\ Cn = Bn \cdot \dfrac{Rn^\alpha}{(Rn^{minus})^\beta} \cdot \exp(-\gamma \cdot (fn - F)) & \text{(formula 2b-2)} \\ (\text{when } \overline{Rn} - TTI_{min,n} \cdot Rn^{target} \leq Rn^{minus}) \end{cases}$$

For instance, as shown in "Table 5.1a", in the Document "3GGP TS25.306 v5.2.0 (UE Radio Access capabilities)", it is possible to consider that the $TTI_{min,n}$ takes on a value such as "2" or "3" in order to reduce a load in reception signal process of the mobile station #n.

In addition, it is possible to consider that the $TTI_{min,n}$ takes on a value such as "2" or "3", even in a case where retransmission control is performed in transmission of Ack/Nack in an uplink transmission channel in order to reduce error rates of Ack/Nack of the H-ARQ.

The packet transmission control device of this embodiment can calculate an average transmission rate, and set a minimum guaranteed transmission rate, in consideration of a $TTI_{min,n}$.

Third Embodiment of the Present Invention (Packet Transmission Control Device of Third Embodiment of the Present Invention)

Descriptions will be provided for a packet transmission control device of a third embodiment of the present invention, focusing on points different from the transmission control device of the above-described first embodiment.

With respect to packet transmission in a packet communications network, as proposed in, for instance, Japanese Patent Laid-Open Official Gazette No. H3-58646, a way has been considered in which two kinds of priority classes PC are provided, and in which packets having a first priority are transmitted preferentially before packets having a second priority.

Hence, in this embodiment, a scheduling unit 140 is configured to manage priority classes $PC_n$ respectively of mobile stations #n, the priority classes relating to packet transmission, and is configured to schedule the packets in accordance with the priority classes $PC_n$.

By referring to FIG. 8, descriptions will be provided below for operations of the transmission control device of this embodiment.

Figure 8:
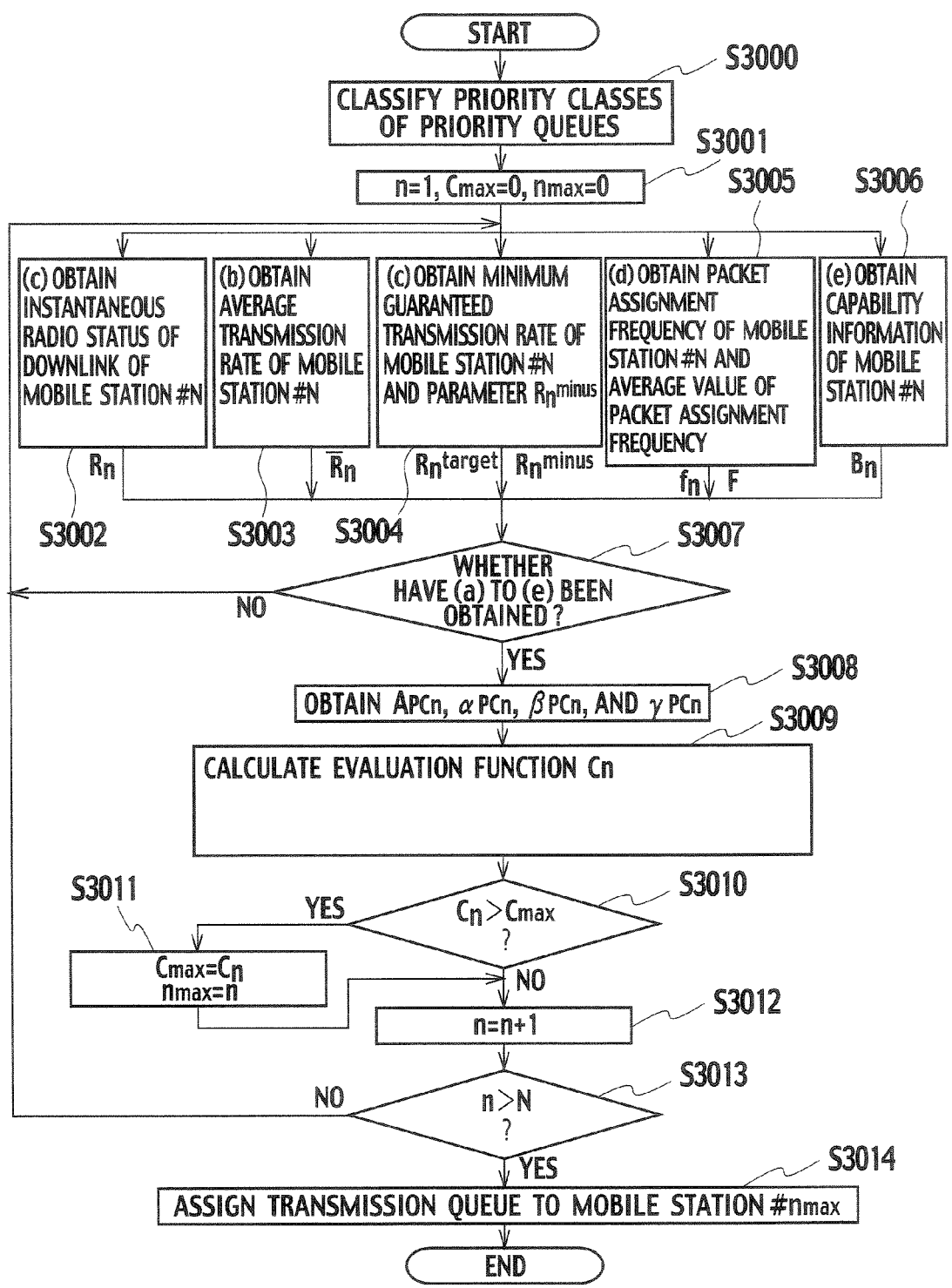
FIG. 8 is a flow chart showing operations of a MAC-hs processor in a baseband signal processor of a radio base station of a third embodiment of the present invention.
Figure 9:
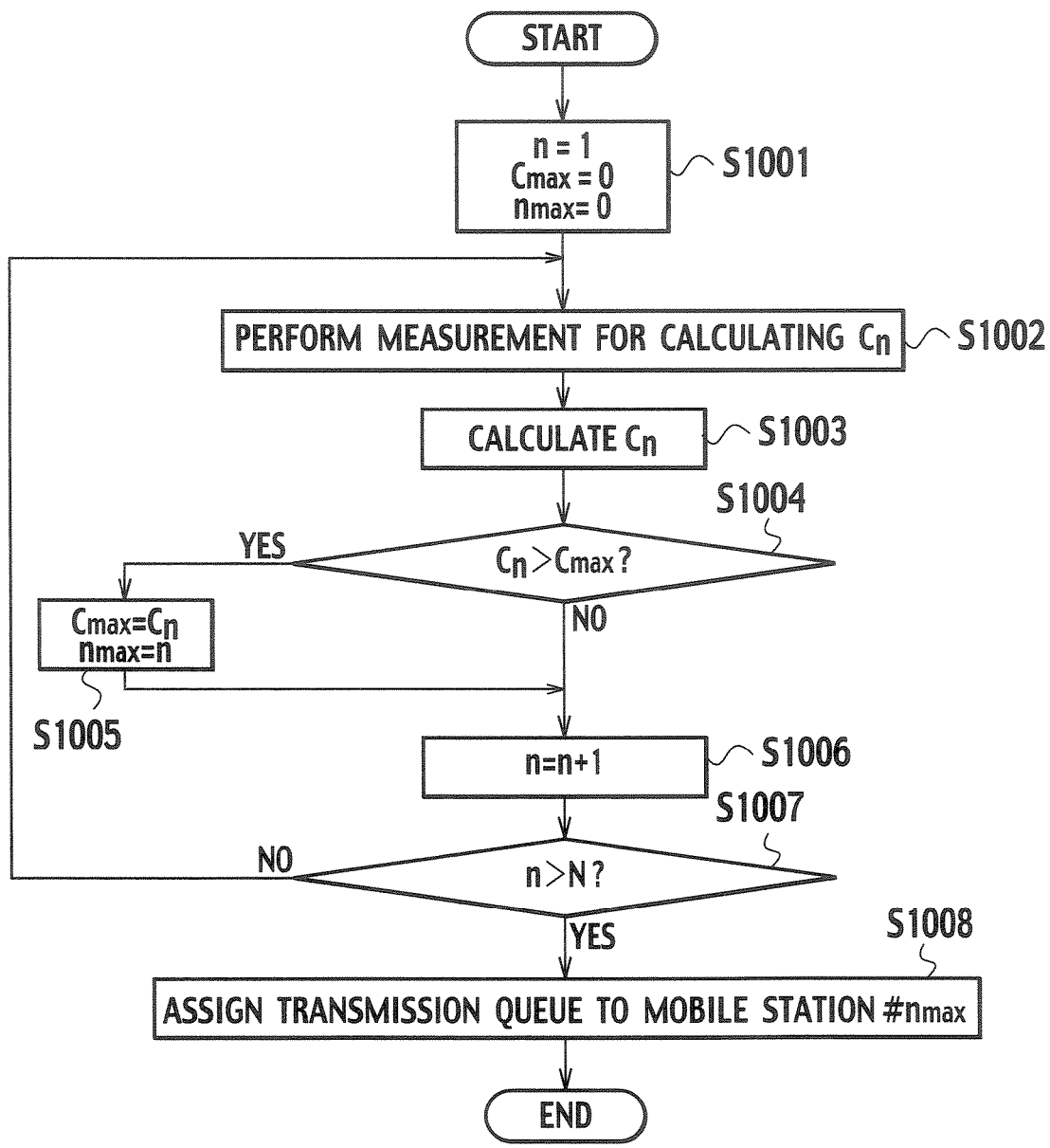
FIG. 9 is a flow chart showing operations of a MAC-hs processor in a baseband signal processor of a radio base station of a conventional technique.

As shown in FIG. 8, in step S3000, an evaluation function calculator unit 210 of a MAC-hs processor unit 112 classifies priority queues (#1 to #N) 141₁ to 141ₙ into several priority classes PC.

The operations of steps S3001 to S3007 are the same as those of steps S2001 to S2005 shown in FIG. 7.

In step S3008, the evaluation function calculator unit 210 obtains all of $R_n$, $\overline{R}_n$, $R_n^{target}$, $R_n^{minus}$, $f_n$, $F$, $B_n$, which are necessary to calculate an evaluation function $C_n$ of a mobile station #n. Thereafter, in step S3009, the evaluation function calculator unit 210 receives predetermined parameters ($\alpha_{PCn}$, $\beta_{PCn}$ and $\tau_{PCn}$) of the respective priority classes $PC_n$, the parameters being specified remotely via a call processor unit 105, and a weighting factor (weight) $A_{PCn}$ (note that $PC_n$ denotes a subscript of the priority class of the mobile station #n). Note that the predetermined parameters ($\alpha_{PCn}$, $\beta_{PCn}$, $\tau_{PCn}$) and the weighting factor (weight) $A_{PCn}$ may be set so that common values are used in each priority class PC.

In step S3009, the evaluation function calculator unit 210 calculates the evaluation function $C_n$ based on the following formula.

$$Cn = A_{PCn} \cdot Bn \cdot \dfrac{Rn^{\alpha_{PCn}}}{(\overline{Rn} - Rn^{target})^{\beta_{PCn}}} \cdot \exp(-\gamma_{PCn} \cdot (fn - F_{PCn})) \quad \text{(formula 3a)}$$

(when $\overline{Rn} - Rn^{target} > Rn^{minus}$)

$$Cn = A_{PCn} \cdot Bn \cdot \dfrac{Rn^{\alpha_{PCn}}}{(Rn^{minus})^{\beta_{PCn}}} \cdot \exp(-\gamma_{PCn} \cdot (fn - F_{PCn})) \quad \text{(formula 3b)}$$

(when $\overline{Rn} - Rn^{target} \leq Rn^{minus}$)

In the formula, "$PC_n$" denotes the priority class to which the mobile station #n belongs. In addition, an average value $F_{PC}$ of packet assignment frequencies (an average value $F_{PC}$ of scheduling frequencies f) of mobile stations is calculated on a priority class PC basis as follows.

$$F_{PC} = \frac{\sum_{PC} fn}{\sum_{PC} 1}$$

Once the evaluation function $C_n$ is calculated as described above, the evaluation function calculator unit 210 determines, in step S3010, whether or not the calculated evaluation function $C_n$ is a maximum value.

Since $C_{max=0}$ (the initial value) is set currently, in step S3011, the evaluation function calculator unit 210 sets $C_{max}$ at the value of the evaluation function $C_n$ which is measured in step S3009, and sets $n_{max}$ as the subscript "n" of the mobile station #n which corresponds to $C_{max}$.

In step S3012, the evaluation function calculator unit 210 increments the value of "n" by "+1" in order to calculate an evaluation function $C_{n+1}$ of the next mobile station #n+1.

In step S3013, the evaluation function calculator unit 210 determines whether or not the value of "n" is larger than the number "N" of the mobile stations which are communicating with a radio base station 100.

In a case where it is determined that the value of "n" is not larger than the number "N" of the mobile stations in step S3013 (the determination is "NO" in step S3013), this operation repeats the loop process of steps S3002 to S3013 until it is determined that the value of "n" is larger than the number "N" of the mobile stations. Accordingly, the evaluation function calculator unit 210 can calculate the evaluation function $C_n$ of every mobile station, which is communicating with the radio base station 100.

Meanwhile, in a case where it is determined that the value of "n" is larger than the number "N" of the mobile stations in step S3013 (the determination is "YES" in step S3013), the evaluation function calculator unit 210 instructs a scheduling unit 140 to assign a transmission queue to a mobile station #$n_{max}$ corresponding to $n_{max}$ set in step 3011.

The packet transmission control device of this embodiment controls the weighting factor $A_{PCn}$ and the indices $\alpha_{PCn}$, $\beta_{PCn}$ and $\delta_{PCn}$ in accordance with the priority classes $PC_n$, and sets a minimum guaranteed transmission rate $R_n^{target}$ for each priority class $PC_n$. Hence, it is made possible to realize an appropriate scheduler in accordance with the priority classes $PC_n$, while guaranteeing a minimum transmission rate corresponding to each priority class $PC_n$.

The packet transmission control device of this embodiment controls the weighting factor $A_{PCn}$ and the indices $\alpha_{PCn}$, $\beta_{PCn}$ and $\delta_{PCn}$ depending on the priority classes $PC_n$, and sets the parameter $\tau_{PCn}$, which is used to control the level of the equalization of the scheduling opportunities, for each priority class $PC_n$. Hence, it is possible to realize an appropriate scheduler in accordance with the priority classes $PC_n$, while realizing equalization of the scheduling opportunities of each priority class $PC_n$ and of the scheduling opportunities among the priority classes $PC_n$.

The packet transmission control device of this embodiment can also realize an appropriate scheduler in accordance with the priority classes $PC_n$ and capability information $B_n$ of the mobile stations #n.

For instance, in each of the above-described (Formula 3a) and (Formula 3b), for instance, two priority classes are provided. PC=1 is set for the higher priority class, and PC=2 is set for the lower priority class. In this case, the classes are set so that "weighting factor $A_1$>weighting factor $A_2$" is obtained. Thereby, it is possible to transmit packets preferentially to the mobile station of the higher priority class. In other words, by making a sufficiently large difference between weighting factors $A_1$ and $A_2$, the packets of the higher priority class are surely transmitted preferentially.

By setting the parameters as "$(\alpha_1, \beta_2)=(1, 1)$" and "$(\alpha_2, \beta_2)=(1, 0)$", the packet transmission control device of this embodiment can operate as a "Proportional Fairness Scheduler" for packets of the higher priority class (PC=1), and as a "MAX C/I Scheduler" for packets of the lower priority class (PC=2) By setting the parameters as "$(\delta_1, \epsilon_2)=(0.9999, 0.99)$", the packet transmission control device of this embodiment can control the packet transmission as follows. A large averaging section is set for packets of the higher priority class (PC=1) with more consideration of fairness in terms of time. A small averaging section is set for packets of the lower priority class (PC=2) with less consideration of fairness in terms of time.

Moreover, the packet transmission control device of this embodiment can set the minimum guaranteed transmission rate for each priority class, in addition to the control of the priority classes as described.

Specifically, for instance, the minimum guaranteed transmission rate $R_n^{target}$ of the mobile station #n having the higher priority class ($PC_n$=1) is set at "256", and the minimum guaranteed transmission rate $R_m^{target}$ of the mobile station #n having the lower priority class ($PC_m$=2) is set at "64". As a result, a higher transmission rate is guaranteed for packets to the mobile station having the higher priority class, and a lower transmission rate is guaranteed for packets to the mobile station having the lower priority class.

In other words, by setting a minimum guaranteed transmission rate for each priority class, it is possible to guarantee minimum transmission rates in accordance with priority classes.

In the packet transmission control device of this embodiment, the evaluation function of each mobile station of the priority class "1" is calculated using the average value of scheduling frequencies of the mobile stations of the priority class "1". The evaluation function of each mobile station of the priority class "2" is calculated using the average value of scheduling frequencies of the mobile stations of the priority class "2".

Hence, the packet transmission control device of this embodiment can realize the equalization of the scheduling opportunities among the mobile stations of the same priority class PC.

Furthermore, in addition to the above-described control in accordance with the priority classes $PC_n$ the packet transmission control device of this embodiment can set the parameter $\gamma_{PCn}$ for each priority class $PC_n$, the parameter $\gamma_{PCn}$ being used for controlling the level of the equalization of the scheduling opportunities.

Specifically, the packet transmission control device of this embodiment sets the parameter $\gamma_1$ of the priority class "1" having the higher priority at "2", and sets the parameter $\gamma_1$ of the priority class "2" having the lower priority at "1". Thereby, it is possible to guarantee the equalization of the scheduling opportunities at a higher level for the packets of the priority class "1", and guarantee the equalization of the scheduling opportunities at a lower level for the packets of the priority class "2".

Alternatively, the packet transmission control device of this embodiment may be configured as follows. The packet transmission control device sets the parameter $\gamma_1$ of the priority class "1" having the higher priority at "1", and sets the parameter $\gamma_1$ of the priority class "2" having the lower priority at "2". Thereby, it is possible to guarantee the equalization of the scheduling opportunities at a lower level for the packets of the priority class "1", and guarantee the equalization of the scheduling opportunities at a higher level for the packets of the priority class "2".

While changing the parameters of the scheduler in accordance with the priority classes, the packet transmission control device of this embodiment sets the statistical population, which is used to calculate the average value of the scheduling frequencies of the plurality of the mobile stations, on a priority class PC basis, to change the level of the equalization of the scheduling opportunities in the statistical population. However, the present invention is not limited to this embodiment.

For instance, the packet transmission control device of the present invention can realize an appropriate scheduler in the following manner. By defining service types (service classes), the transmission control device of the present invention sets: parameters of the scheduler depending on the service types; and statistical population, which is used to calculate the average value of the scheduling frequencies of the plurality of the mobile stations on a service type basis. Hence, the level of the equalization of the scheduling opportunities is changed in the statistical population. Accordingly, an appropriate scheduler can be realized.

The service types classify services for transferring packets having various data volumes. The services include image packet transferring services and audio packet transferring services.

Alternatively, the transmission control device of the present invention can realize an appropriate scheduler in the following manner. By defining contract types, the transmission control device of the present invention sets: parameters of the scheduler depending on the contract types; and statistical population, which is used to calculate the average value of the scheduling frequencies of the plurality of the mobile stations on a contract type basis. Hence, the level of the equalization of the scheduling opportunities is changed in the statistical population. Accordingly, an appropriate scheduler can be realized.

The contract types classify contracts of various service charges. The services include, for instance, a Low Class Contract and a High Class Contract.

Alternatively, the transmission control device of the present invention can realize an appropriate scheduler in the following manner. By defining cell types, the transmission control device of the present invention sets: parameters of the scheduler depending on the cell types; and statistical population, which is used to calculate the average value of the scheduling frequencies of the plurality of the mobile stations on a cell type basis. Hence, the level of the equalization of the scheduling opportunities is changed in the statistical population. Accordingly, an appropriate scheduler can be realized.

The cell types classify cell configuration. The cell types include, for instance, information on whether the cell is outdoor or indoor; information on whether the cell is in a town or a suburb; and information on whether the cell is in a high traffic area or a low traffic area.

Alternatively, the transmission control device of the present invention can realize an appropriate scheduler in the following manner. By defining terminal device types, the transmission control device of the present invention sets: parameters of the scheduler depending on the terminal device types; and statistical population, which is used to calculate the average value of the scheduling frequencies of the plurality of the mobile stations on a terminal device type basis. Hence, the level of the equalization of the scheduling opportunities is changed in the statistical population. Accordingly, an appropriate scheduler can be realized.

The terminal device types classify various terminal devices. The terminal device types include, for instance, classes based on the identification information on the mobile stations; presence-or-absence or types of a RAKE reception function, an equalizer, reception diversity, an interference canceller and the like; and terminal device capabilities such as a modulation scheme, the number of codes and the number of bits, with all of which data is receivable.

Furthermore, the packet transmission control device of this embodiment can set the capability information $B_n$, which is based on the capabilities which the mobile stations have, in addition to the above-describe priority classes PC.

In case where mobile stations #1, #2 and #3 exist, for instance, the mobile stations #1 and #2 have the higher priority class, and the weighting factor is set at "3.0". Meanwhile, the mobile station #3 has the lower priority class, and the weighting factor is set at "1.0".

The mobile station #1 includes a RAKE receiver, and each of the mobile stations #2 and #3 includes an equalizer. The capability information $B_n$ of the mobile station #1 is set at "1.0", and the capability information $B_n$ of each of the mobile stations #2 and #3 is set at "2.0".

In this case, the packet transmission control device of this embodiment can perform scheduling in consideration of both the priority classes and the capabilities of the mobile stations.

In other words, by incorporating the capability information $B_n$ into the evaluation function $C_n$, the packet transmission control device of this embodiment can provide the scheduling in consideration of both the priority classes and the capabilities of the mobile stations.

Fourth Embodiment of the Present Invention (Packet Transmission Control Device of Fourth Embodiment of the Present Invention)

Descriptions will be provided for a packet transmission control device of a fourth embodiment of the present invention, focusing on points different from the above-described third embodiment.

The packet transmission control device of this embodiment is configured to use an evaluation function $C_n$ in consideration of a minimum value ($TTI_{min,n}$: Minimum TTI interval) of a time period in which a mobile station #n can receive packets.

Specifically, an evaluation function calculator 210 of the packet transmission control device calculates the evaluation function $C_n$ according to

[* 35]

$$\begin{cases} Cn = A_{PCn} \cdot Bn \cdot \dfrac{Rn^{\alpha}}{(TTI_{min,n} \cdot (\overline{Rn} - Rn^{target}))^{\beta_{PCn}}} \cdot & \text{(formula 3a-1)} \\ \exp(-\gamma_{PCn} \cdot (fn - F_{PCn})) \\ \left(\text{when } \overline{Rn} - Rn^{target} > \dfrac{Rn^{minus}}{TTI_{min,n}}\right) \\ Cn = A_{PCn} \cdot Bn \cdot \dfrac{Rn^{\alpha_{PCn}}}{(Rn^{minus})^{\beta_{PCn}}} \cdot \exp(-\gamma_{PCn} \cdot (fn - F_{PCn})) & \text{(formula 3b-1)} \\ \left(\text{when } \overline{Rn} - Rn^{target} \leq \dfrac{Rn^{minus}}{TTI_{min,n}}\right) \end{cases}$$

or

-continued $$\begin{cases} Cn = A_{PCn} \cdot Bn \cdot \dfrac{Rn^{\alpha_{PCn}}}{(\overline{R}n - TTI_{min,n} \cdot Rn^{target})^{\beta_{PCn}}} \cdot & \text{(formula 3a-2)} \\ \exp(-\gamma_{PCn} \cdot (fn - F_{PCn})) \\ (\text{when } \overline{R}n - TTI_{min,n} \cdot Rn^{target} > Rn^{minus}) \\ Cn = A_{PCn} \cdot Bn \cdot \dfrac{Rn^{\alpha_{PCn}}}{(Rn^{minus})^{\beta_{PCn}}} \cdot \exp(-\gamma_{PCn} \cdot (fn - F_{PCn})) & \text{(formula 3b-2)} \\ (\text{when } \overline{R}n - TTI_{min,n} \cdot Rn^{target} \leq Rn^{minus}). \end{cases}$$

For instance, as shown in the "Table 5.1a" in the Document "3GPP TS25.306 v5.2.0 (UE Radio Access capabilities)", it is conceivable that the $TTI_{min,n}$ takes on a value "2" or "3" in order to reduce a load in reception signal process of the mobile station #n.

In addition, it is conceivable that the $TTI_{min,n}$ takes on a value "2" or "3", even in a case where the re-transmission control is performed on transmission of Ack/Nack of the H-ARQ in order to reduce a load in reception signal process of the mobile station #n.

The packet transmission control device of this embodiment can calculate an average transmission rate, and set a minimum guaranteed transmission rate, in consideration of a $TTI_{min,n}$.

Modified Example 2

In the above-described embodiment, descriptions have been provided for the HSDPA which is a high-speed packet transmission system in the 3GPP. However, the present invention is not limited to the HSDPA, and can be applied to an arbitrary high-speed packet transmission system which performs transmission control processing of downlink packets in a mobile communications system.

For instance, the present invention can be applied to a high-speed packet transmission system such as "cdma2000 1x-EV DO" in the 3GPP2 and the high-speed packet transmission system in the "TDD".

INDUSTRIAL APPLICABILITY

As described above, the present invention can provide a packet transmission control device and a packet transmission control method, which makes it possible to realize the scheduling of packets to each mobile station in consideration of QoS of various services, difference in capabilities of mobile stations, and equalization of the scheduling opportunities, while causing the conventional Proportional Fairness Scheduler to operate.

The invention claimed is:

1. A packet transmission control device which controls transmission of packets to a plurality of mobile stations, the device comprising:
   an average transmission rate obtaining unit configured to obtain an average transmission rate of the packets to be transmitted to each of the plurality of mobile stations;
   a minimum guaranteed transmission rate obtaining unit configured to obtain a minimum guaranteed transmission rate of the packets to be transmitted to each of the plurality of mobile stations;
   a scheduling frequency obtaining unit configured to obtain a scheduling frequency indicating a number of times the packets have been scheduled to each of the plurality of mobile stations over a predetermined time period;
   a capability information obtaining unit configured to obtain capability information on each of the plurality of mobile stations; and
   a scheduling unit configured to schedule the packets to each of the plurality of mobile stations, based on the average transmission rate, the minimum guaranteed transmission rate, the scheduling frequency and the capability information,
   wherein the average transmission rate obtaining unit is configured to obtain an average transmission rate of the packets to each mobile station n, which is expressed with $\overline{R}_n$
   the minimum guaranteed transmission rate obtaining unit is configured to obtain a minimum guaranteed transmission rate $R_n^{target}$ of the packets to the mobile station n;
   the scheduling frequency obtaining unit is configured to obtain a scheduling frequency $f_n$ indicating a frequency in which the packets have been scheduled to the mobile station n;
   the capability information obtaining unit is configured to obtain capability information $B_n$ on the mobile station;
   the scheduling unit is configured to obtain: radio status $R_n$ between the packet transmission control device and the mobile station n;
   an average value F of the scheduling frequencies $f_n$ respectively of the plurality of mobile stations; predetermined parameters $\alpha$ and $\beta$; and a first parameter $\gamma$ used to control equalization of opportunities in which the packets are scheduled to the mobile station n; and
   the scheduling unit is configured to select one of the mobile stations, to which the packets are scheduled, based on a relationship among $R_n$, $(\overline{R}_n - R_n^{target})^\beta$, $f_n$, F, $B_n$, $\gamma$.

2. The packet transmission control device according to claim 1, wherein the scheduling unit is configured to schedule the packets to one of the mobile stations which maximizes an evaluation function $C_n$ calculated according to $$Cn = Bn \cdot \frac{Rn^\alpha}{(\overline{R}n - Rn^{target})^\beta} \cdot \exp(-\gamma \cdot (fn - F)).$$

3. The packet transmission control device according to claim 1 wherein
   the scheduling unit is configured to obtain a second parameter $R_n^{minus}$ used to prevent the average transmission rate $\overline{R}_n$
   from being equal to or smaller than the minimum guaranteed transmission rate; and
   the scheduling unit is configured to select one of the mobile stations, to which the packets are scheduled, based on a relationship among $R_n^\alpha$, $(\overline{R}_n - R_n^{target})^\beta$, $(R_n^{minus})^\beta$, $f_n$, F, $B_n$, $\gamma$.

4. The packet transmission control device according to claim 3, wherein the scheduling unit is configured to schedule the packets to one of the mobile stations which maximizes the evaluation function $C_n$ calculated according to $$Cn = Bn \cdot \frac{Rn^\alpha}{(\overline{R}n - Rn^{target})^\beta} \cdot \exp(-\gamma \cdot (fn - F))$$

(when $\overline{R}n - Rn^{target} > Rn^{minus}$)

-continued $$Cn = Bn \cdot \frac{Rn^\alpha}{(Rn^{minus})^\beta} \cdot \exp(-\gamma \cdot (fn - F))$$

(when $\overline{R}n - Rn^{target} \leq Rn^{minus}$).

5. The packet transmission control device according to claim 1, wherein
the scheduling unit is configured to manage a priority class $PC_n$ for each mobile station n, the priority class $PC_n$ relating to transmission of the packets;
the scheduling unit is configured to obtain: an weighting factor $A_{PCn}$ of the mobile station n;
the predetermined parameters $\alpha_{PCn}$ and $\beta_{PCn}$; the first parameter $\gamma_{PCn}$; and an average value $F_{PCn}$ of the scheduling frequency $F_{PCn}$; and
the scheduling unit is configured to select one of the mobile stations, to which the packets are scheduled, based on a relationship among $A_{PCn}, R_n^{\alpha PCn}, (\overline{R}_n - R_n^{target})^{\beta PCn}, f_n, F_{PCn}, \gamma_{PCn}, B_n$.

6. The packet transmission control device according to claim 5, wherein the scheduling unit is configured to schedule the packets to one of the mobile stations which maximizes an evaluation function $C_n$ calculated according to $$Cn = A_{PCn} \cdot Bn \cdot \frac{Rn^{\alpha PCn}}{(\overline{R}n - Rn^{target})^{\beta PCn}} \cdot \exp(-\gamma_{PCn} \cdot (fn - F_{PCn})).$$

7. The packet transmission control device according to claim 5, wherein
the scheduling unit is configured to obtain a second parameter $R_n^{minus}$ which is used to prevent the average transmission rate
$\overline{R}_n$
from being equal to or smaller than the minimum guaranteed transmission rate; and
the scheduling unit is configured to select one of the mobile stations, to which the packets are scheduled, based on a relationship among $A_{PCn} = R_n^{\alpha PCn}, (\overline{R}_n - R_n^{target})^{\beta PCn}, (R_n^{minus})^{\beta PCn}, f_n, F_{PCn}, \gamma_{PCn}, B_n$.

8. The packet transmission control device according to claim 7, wherein the scheduling unit is configured to schedule the packets to one of the mobile stations which maximizes an evaluation function $C_n$ calculated according to $$Cn = A_{PCn} \cdot Bn \cdot \frac{Rn^{\alpha PCn}}{(\overline{R}n - Rn^{target})^{\beta PCn}} \cdot \exp(-\gamma_{PCn} \cdot (fn - F_{PCn}))$$

(when $\overline{R}n - Rn^{target} > Rn^{minus}$)

$$Cn = A_{PCn} \cdot Bn \cdot \frac{Rn^{\alpha PCn}}{(Rn^{minus})^{\beta PCn}} \cdot \exp(-\gamma_{PCn} \cdot (fn - F_{PCn}))$$

(when $\overline{R}n - Rn^{target} \leq Rn^{minus}$).

9. The packet transmission control device according to claim 1, wherein the scheduling unit is configured to set the average value F of the scheduling frequencies $f_n$ of the plurality of mobile stations, the predetermined parameters $\alpha$ and $\beta$, and the first parameter $\gamma$, for each service type, each contract type, each terminal device type, each cell type or each priority class.

10. A packet transmission control device which controls transmission of packets to a plurality of mobile stations, the device comprising:
an average transmission rate obtaining unit configured to obtain an average transmission rate of the packets to be transmitted to each of the plurality of mobile stations;
a minimum guaranteed transmission rate obtaining unit configured to obtain a minimum guaranteed transmission rate of the packets to be transmitted to each of the plurality of mobile stations;
a scheduling frequency obtaining unit configured to obtain a scheduling frequency indicating a number of times the packets have been scheduled to each of the plurality of mobile stations over a predetermined time period;
a capability information obtaining unit configured to obtain capability information on each of the plurality of mobile stations; and
a scheduling unit configured to schedule the packets to each of the plurality of mobile stations, based on the average transmission rate, the minimum guaranteed transmission rate, the scheduling frequency and the capability information,
wherein the minimum guaranteed transmission rate obtaining section is configured to set the minimum guaranteed transmission rate for each service type, each contract type, each terminal device type, each cell type or each priority class.

11. A packet transmission control device which controls transmission of packets to a plurality of mobile stations, the device comprising:
an average transmission rate obtaining unit configured to obtain an average transmission rate of the packets to be transmitted to each of the plurality of mobile stations;
a minimum guaranteed transmission rate obtaining unit configured to obtain a minimum guaranteed transmission rate of the packets to be transmitted to each of the plurality of mobile stations;
a scheduling frequency obtaining unit configured to obtain a scheduling frequency indicating a number of times the packets have been scheduled to each of the plurality of mobile stations over a predetermined time period;
a capability information obtaining unit configured to obtain capability information on each of the plurality of mobile stations; and
a scheduling unit configured to schedule the packets to each of the plurality of mobile stations, based on the average transmission rate, the minimum guaranteed transmission rate, the scheduling frequency and the capability information,
wherein the average transmission rate obtaining unit is configured to calculate the average transmission rate
$\overline{R}_n(t)$
according to $\overline{R}_n(t) = \delta \cdot \overline{R}_n(t-1) + (1-\delta) \cdot \gamma_n$, using an instantaneous transmission rate $r_n$ of the packets to a each mobile station n, and a forgetting factor $\delta$.

12. A packet transmission control device which controls transmission of packets to a plurality of mobile stations, the device comprising:
an average transmission rate obtaining unit configured to obtain an average transmission rate of the packets to be transmitted to each of the plurality of mobile stations;
a minimum guaranteed transmission rate obtaining unit configured to obtain a minimum guaranteed transmission rate of the packets to be transmitted to each of the plurality of mobile stations;

a scheduling frequency obtaining unit configured to obtain a scheduling frequency indicating a number of times the packets have been scheduled to each of the plurality of mobile stations over a predetermined time period;

a capability information obtaining unit configured to obtain capability information on each of the plurality of mobile stations; and a scheduling unit configured to schedule the packets to each of the plurality of mobile stations, based on the average transmission rate, the minimum guaranteed transmission rate, the scheduling frequency and the capability information, wherein the scheduling frequency obtaining unit is configured to calculate the scheduling frequency $f_n(t)$ according to $f_n(t)=\tau \cdot f_n(t-1)+(1-\tau)\cdot Al_n$, by use of information $Al_n$ which indicates wherever or not the packets have been scheduled to a mobile station n at a time point t, and a forgetting factor $\delta$.

13. The packet transmission control device which controls transmission of packets to a plurality of mobile stations, the device comprising:

an average transmission rate obtaining unit configured to obtain an average transmission rate of the packets to be transmitted to each of the plurality of mobile stations;

a minimum guaranteed transmission rate obtaining unit configured to obtain a minimum guaranteed transmission rate of the packets to be transmitted to each of the plurality of mobile stations;

a scheduling frequency obtaining unit configured to obtain a scheduling frequency indicating a number of times the packets have been scheduled to each of the plurality of mobile stations over a predetermined time period;

a capability information obtaining unit configured to obtain capability information on each of the plurality of mobile stations; and a scheduling unit configured to schedule the packets to each of the plurality of mobile stations, based on the average transmission rate, the minimum guaranteed transmission rate, the scheduling frequency and the capability information, wherein the capability information obtaining unit is configured to obtain, as the capability information on each of the mobile stations, at least any one of: presence or absence of a reception diversity function; whether or not the mobile station applies to a transmission diversity; presence or absence of an advanced receiver function; the maximum data volume receivable at a time; a modulation scheme with which data is receivable; the maximum receivable data volume; and the minimum time period from a time when the mobile station receives a packet until a time when the mobile station is capable of receiving another packet.

* * * * *